(12) United States Patent
Shukla et al.

(10) Patent No.: US 11,722,573 B2
(45) Date of Patent: Aug. 8, 2023

(54) ARTIFICIAL INTELLIGENCE WORKLOAD MIGRATION FOR PLANET-SCALE ARTIFICIAL INTELLIGENCE INFRASTRUCTURE SERVICE

(71) Applicant: Microsoft Technology Licensing, LLC, Redmond, WA (US)

(72) Inventors: Dharma Kiritkumar Shukla, Bellevue, WA (US); Muthian Sivathanu, Chennai (IN); Lu Xun, Redmond, WA (US); Rimma Vladimirovna Nehme, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/359,471

(22) Filed: Jun. 25, 2021

(65) Prior Publication Data
US 2022/0311832 A1   Sep. 29, 2022

(30) Foreign Application Priority Data
Mar. 26, 2021   (IN) .............................. 202141013580

(51) Int. Cl.
| | |
|---|---|
| H04L 67/148 | (2022.01) |
| G06N 3/08 | (2023.01) |
| G06F 9/48 | (2006.01) |
| G06T 1/20 | (2006.01) |
| H04L 67/10 | (2022.01) |

(52) U.S. Cl.
CPC .......... *H04L 67/148* (2013.01); *G06F 9/4856* (2013.01); *G06N 3/08* (2013.01); *G06T 1/20* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 10,043,232 B1* | 8/2018 | Ramadoss | ............. G06F 9/4856 |
| 2007/0180436 A1* | 8/2007 | Travostino | ............ G06F 9/4856 |
| | | | 717/138 |
| 2011/0084973 A1 | 4/2011 | Masood | |

OTHER PUBLICATIONS

Shubham Chaudhary, Balancing Efficiency and Fairness in Heterogeneous GPU Clusters for Deep Learning, Apr. 27, 2020.*
"International Search Report and Written Opinion Issued in PCT Application No. PCT/US22/017790", dated May 13, 2022, 16 Pages.
Prades, et al., "GPU-Job Migration: The rCUDA Case", In Journal of Transactions on Parallel and Distributed Systems, vol. 30, Issue 12, Dec. 1, 2019, pp. 2718-2729.

\* cited by examiner

*Primary Examiner* — Anh Nguyen
(74) *Attorney, Agent, or Firm* — Barta, Jones & Foley, PLLC

(57) ABSTRACT

The disclosure herein describes platform-level migration for deep learning training (DLT) jobs from a checkpointed stated between a source node and a destination node. The checkpointing is performed through capturing GPU state (e.g., device state) and CPU state (e.g., host state). The GPU state includes GPU data (e.g., model parameters, optimizer state, etc.) that is located in the GPU and GPU context (e.g., the default stream in GPU, various handles created by libraries). Restoring the DLT job on the destination node involves resumption of processing of a destination GPU at the same checkpointed state.

20 Claims, 12 Drawing Sheets

ARTIFICIAL INTELLIGENCE WORKLOAD MIGRATION FOR PLANET-SCALE ARTIFICIAL INTELLIGENCE INFRASTRUCTURE SERVICE

CROSS-REFERENCE TO RELATED APPLICATIONS

This application claims the benefit of India provisional application number 202141013580 filed on Mar. 26, 2021 and entitled "ABILITY TO MIGRATE AI WORKLOADS FOR PLANET-SCALE AI INFRASTRUCTURE SERVICE", which is hereby incorporated by reference in its entirety for all intents and purposes.

BACKGROUND

Artificial intelligence (AI) innovations require highly scalable, performant, robust, and technically efficient AI infrastructure. Current methods of incrementally extending existing general-purpose infrastructure as a service (IaaS) and cloud-based environments have significant limitations as AI workloads are fundamentally different and necessitate purpose-built AI infrastructure. Managing the minutia of current infrastructure presents substantial challenges to data scientists trying to accelerate the algorithmic innovations of AI.

Today, an increasingly popular computing trend in the world of AI computing is the area of deep learning (DL). DL has already had significant impact on widely used personal products for voice and image recognition and has significant potential to impact businesses. DL jobs represent a vital and growing set of computing workloads, especially in cloud data centers. But, like most AI models, DL jobs are compute-intensive and, hence, heavily reliant on graphics processing units (GPUs). A GPU virtual machine (VM) in the cloud is more technically inefficient than a regular VM. Cloud operators and large companies that manage clusters of tens of thousands of GPUs rely on cluster schedulers to ensure technically efficient utilization of the GPUs. The common practice today is to use a traditional cluster scheduler, such as Kubernetes or Yet Another Resource Negotiator (YARN), designed for handling big-data jobs such as MapReduce, which is a programming model and implementation for processing and generating big data sets.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects described herein are generally directed to migrating DLT jobs between nodes (from a source node to a destination node) in a large-scale cloud environment. When the DLT jobs are to be migrated, the DLT jobs are checkpointed and migrated from a checkpointed state. To do so, the GPU state, GPU memory, CPU state, CPU memory, and/or additional state data are captured and stored in shared memory that is accessible to an intermediary proxy node. In some examples, the GPU state includes GPU data including model parameters and an optimizer state located in the GPU during checkpointing, and the checkpointed state includes, at least, the GPU state and the CPU state. The DLT job may then be migrated to the destination node at the checkpointed state, using the GPU state and the CPU state. After migration, the DLT job is resumed on the destination node.

BRIEF DESCRIPTION OF THE DRAWINGS

The present description will be better understood from the following detailed description read in light of the accompanying drawings, wherein.

Corresponding reference characters indicate corresponding parts throughout the drawings.

DETAILED DESCRIPTION

Figure 1:
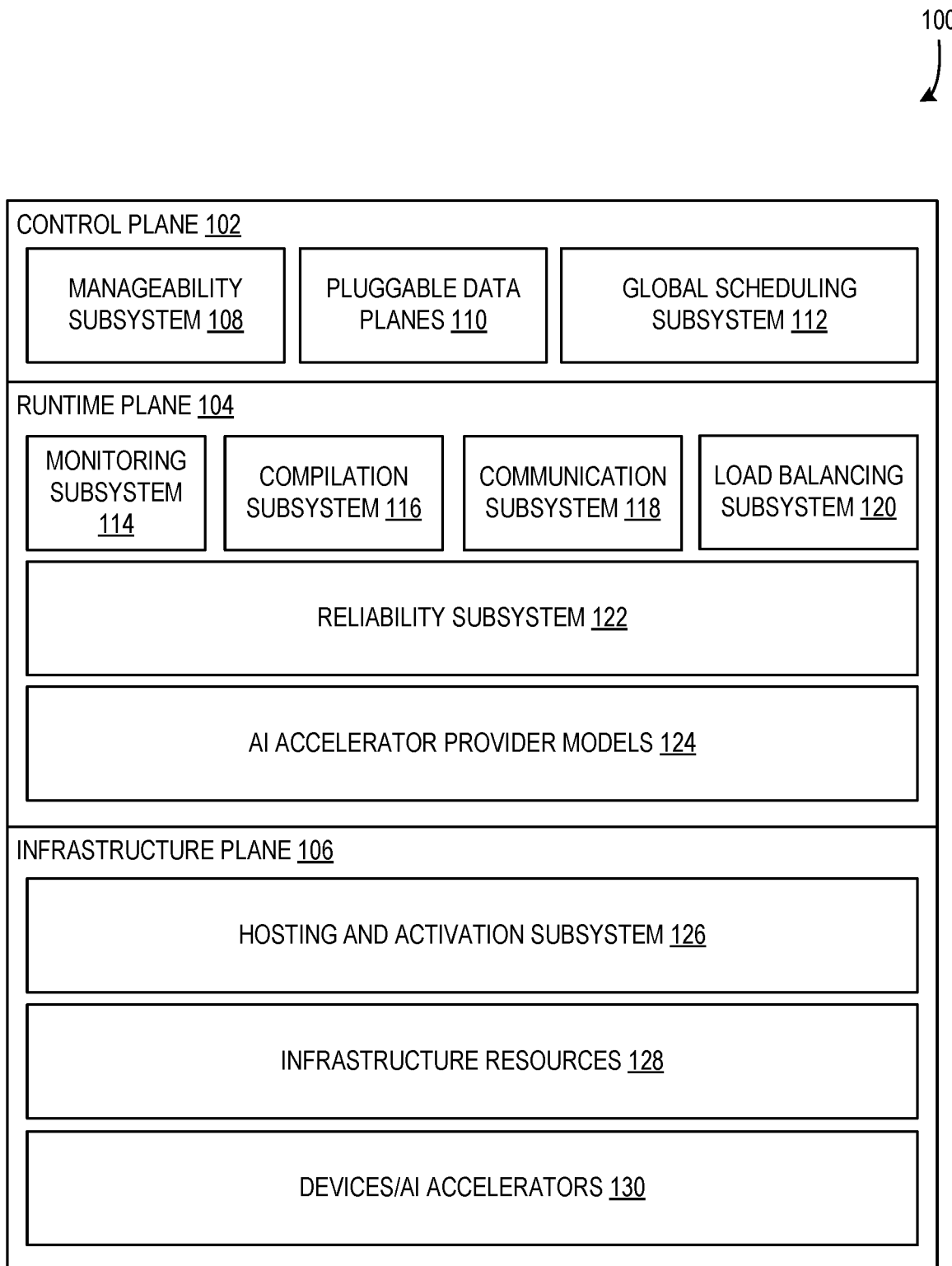
FIG. 1 is a block diagram illustrating a system configured for providing infrastructure service for artificial intelligence (AI) workloads.

The various implementations, examples, and embodiments are described in detail with reference to the accompanying drawings. Wherever possible, the same reference numbers will be used throughout the drawings to refer to the same or like parts. References made throughout this disclosure relating to specific examples, implementations, and embodiments are provided solely for illustrative purposes but, unless indicated to the contrary, are not meant to limit all examples.

Conventionally, there are two approaches to move a deep learning training (DLT) or artificial intelligence (AI) job.

One requires the developer who writes the script for a DLT job to actually write custom code for checkpointing. This code can be in the form of using very restrictive libraries or in the form of logic for what to do when a job is preempted and how to get it to the same state. This is fairly complicated for the programmer, which is why most DLT jobs today do not handle checkpointing or preemption. As a result, a scheduler cannot rely on this. Typically, a low percentage of DLT jobs have checkpointing enabled, which is unreliable from the perspective performance expectations that a scheduler can provide. Aspects of the disclosure solve these and other technical problems in unconventional ways.

This disclosure describes several implementations and examples for transparently and preemptively migrating DLT jobs and inferences from one group of processing resources in the cloud to another. The disclosed examples and implementations provide checkpoints for given DLT jobs, using either a proxy service that stores the host client configurations and reconfigures the server-based configurations before moving the DLT jobs to a new group of resources or by implementing a barrier across multiple processing resources, such as a central processing unit (CPU), graphics processing unit (GPU), application-specific integrated circuit (ASIC), field programmable gate array (FPGA), or the like. The disclosed examples provide the ability to transparently preempt a job, migrate it to another node, and then continue processing the job on the new node.

To provide a better framework, examples described herein make preemptability and migratability the default for every DLT job. Every DLT job becomes inherently preemptable and migratable without the developer having to run or write anything special. So users do not have to do anything special to preempt or migrate a job. This is done by intercepting, at a low enough level, and checkpointing the process state of a DLT job in a way that the user program is not aware what is happening—in other words, it is transparent to the above software layers (both user code as well as framework libraries, e.g., PyTorch or TensorFlow).

For example, if a large DLT job is being processed on several GPUs in a cluster that are scattered across the cluster, some examples may de-fragment such processing by moving the jobs around to GPUs that are locationally proximate to each other. This is one example. Failure recovery is another. There are a lot of examples of when it is useful to move jobs across a cluster.

A DLT job is a machine-learning, big-data job that is allocated a set of GPUs at job startup and holds exclusive access to its GPUs until completion. While the disclosed examples are discussed in relation to DLT jobs and inferences, any kind of AI job may be migrated using the disclosed techniques, such as, for example but without limitation, a deep neural network (DNN) or "deep net" job. Such jobs may be long running (e.g., processing for several hours or days or weeks or months). Moving jobs after they start processing potentially jeopardizes hours, days, or longer of processing time. The disclosed examples and implementations provide a way to move jobs to other processing resources in the cloud at the point in time in which the jobs are processing, eliminating the loss of any significant work.

Nodes are machines in a cloud infrastructure and node pools are subsets of machines that have the same configuration, including machine type (CPU and memory) authorization scopes. Node pools represent a subset of nodes within a cluster, and a container cluster can contain one or more node pools. The disclosed examples and embodiments migrate DLT jobs from one node or node pool over to another node or node pool.

Nodes that are part of the cluster are susceptible to occasional downtime. This can be either as part of planned maintenance where the node is brought down for a specified time in an orderly fashion or an unplanned downtime where the machine abruptly stops due to a software or hardware issue. Worker Nodes are where machine learning workloads run. Ideally, when a node is down, whether, for planned maintenance, or an abrupt downtime, these workloads should migrate to other available nodes or wait in the queue to be started when possible.

Having generally and specifically described some implementations and examples, attention is directed to the accompanying drawings to provide further clarity.

FIG. 1 is a block diagram illustrating a system 100 configured for providing infrastructure service for AI workloads according to an embodiment. The system 100 includes a control plane 102, a runtime plane 104, and an infrastructure plane 106. In some examples, the system 100 is a distributed computing infrastructure system that includes hardware devices distributes across many different locations (e.g., a global or planet-scale distributed system). Further, the system 100 is configured specifically to enable the execution of AI workloads, such that the hardware, firmware, and/or software of the system 100 is configured to enable technically efficient execution of tasks associated with AI workloads. Alternatively, or additionally, the system 100 may include hardware, firmware, and/or software configured specifically to enable the execution of other types of workloads without departing from the description.

The control plane 102 includes a manageability subsystem 108, pluggable data planes 110, and a global scheduling subsystem 112. In some examples, the control plane 102 is configured to receive or accept AI workloads and associated data through a variety of extensible or pluggable data planes 110 that may be defined by the tenants of the system (e.g., plugging in an alternate data plane below the scheduler to support Kubernetes or another similar system running in a tenant's private data center). Those AI workloads are scheduled for execution on the infrastructure of the system 100 (e.g., the infrastructure plane 106), as described herein.

The manageability subsystem 108 includes hardware, firmware, and/or software configured to provide interactive processing of AI workload requests to tenants. Further, the manageability subsystem 108 is configured to provide all infrastructure resources of the system 100 in all regions of the system's operation. In some examples, the manageability subsystem 108 includes manageability replicas in various regions of the system 100 such that the infrastructure resources of the system 100 are multi-mastered by various replicas as an interface between tenants and the system 100. The manageability subsystem 108 may be decoupled from the global scheduler subsystem 112.

The global scheduler subsystem 112 includes hardware, firmware, and/or software configured to schedule AI workloads/jobs for execution on the infrastructure resource of the system 100 as described herein. In some examples, the global scheduler subsystem 108 includes hierarchical schedulers: global scheduler(s), regional schedulers, and coordinator services. The global scheduler is responsible for preparing schedules corresponding to the AI workloads (e.g., jobs, models, and/or pods) and handing them over to the regional schedulers based on those prepared schedules. The regional scheduler is responsible for managing and reporting regional capacity with the global scheduler and then also executing schedule received from the global scheduler. The coordinator service is responsible for translating the schedules into physical resource allocations across clusters of infrastructure resources within a region. The coordinator service may also constitute or otherwise be closely associated with the reliability subsystem 122 as described herein. The global scheduling subsystem 112 is described in greater detail below.

The runtime plane 104 includes subsystems configured to enable the AI workloads to be distributed to and executed on the infrastructure plane 106 as described herein. Such subsystems may include a monitoring subsystem 114, a compilation subsystem 116, a communication subsystem 118, and/or a load balancing subsystem 120. Further, the runtime plane 104 includes a reliability subsystem 122 configured for securing the reliability of execution of AI workloads while enabling such workloads to be checkpointed and/or migrated throughout the infrastructure resources of the system 100. The runtime plane 104 further includes AI accelerator provider models 124 that are configured to enable the use of a variety of libraries and/or configurations for managing AI accelerators when executing AI workloads. The runtime plane 104 is described in greater detail below.

The infrastructure plane 106 includes hardware, firmware, and/or software for executing the AI workloads based on the schedules provided by the control plane 102 and instructions received from the runtime plane 104. The infrastructure plane 106 includes hosting and activation subsystems 126, infrastructure resources 128, and devices/AI accelerators 130. The infrastructure plane 106 is described in greater detail below.

Figure 2:
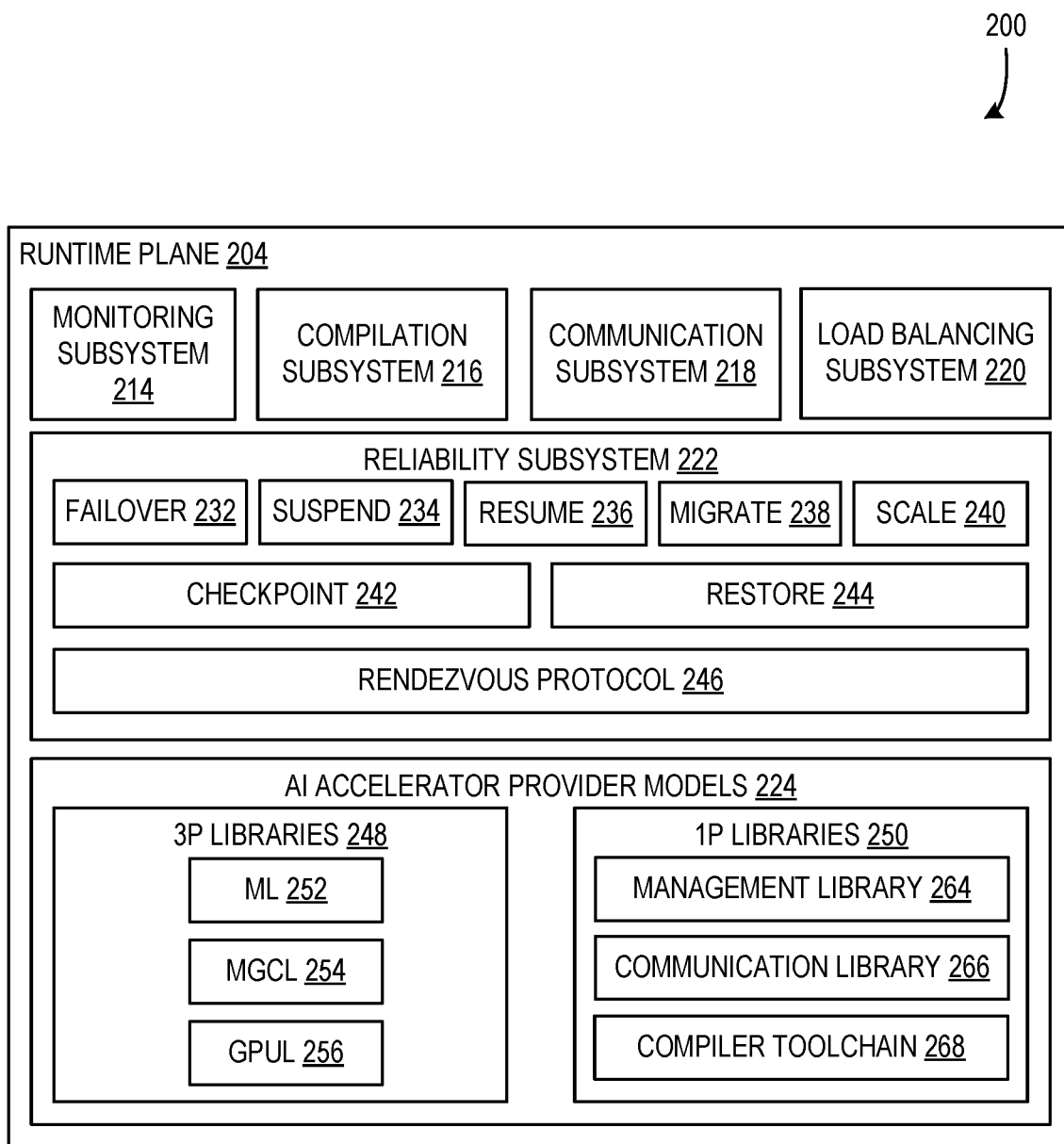
FIG. 2 is a block diagram illustrating a runtime plane of the system of FIG. 1.

FIG. 2 is a block diagram 200 illustrating a runtime plane 204 of the system 100 of FIG. 1 according to an embodiment. In some examples, the runtime plane 204 is substantially the same as the runtime plane 104 described above with respect to FIG. 1. The runtime plane 204 includes a monitoring subsystem 214, a compilation subsystem 216, a communication subsystem 218, a load balancing subsystem 220, a reliability subsystem 222, and AI accelerator provider models 224.

The reliability subsystem 222 includes routines for interacting with AI workloads to ensure their reliability. In some examples, the routines include failover 232, suspend 234, resume 236, migrate 238, scale 240, checkpoint 242, and restore 244. The checkpoint 242 and restore 244 routines may be configured as the core routines and the other routines (failover 232, suspend 234, resume 236, migrate 238, and scale 240) may be configured to use checkpoint 242 and/or restore 244 routines to achieve the desired results.

The checkpoint 242 routine is configured to save the state of an AI workload as it is executed, such that the saved state can be used to continue execution of the AI workload from the saved point in time. Checkpoint 242 may be used to perform the suspend 234 routine to halt the execution of an AI workload for a period of time and/or to perform the migrate 238 routine to save the state of the AI workload such that it can be moved to another set of infrastructure resources for continued execution.

The restore 244 routine is configured to take a saved state of an AI workload as input and restore the execution of the AI workload on infrastructure resources starting at the point of the saved state. The restore 244 routine may be used to perform the resume 236 routine and/or to restore the execution of an AI workload that has been migrated to another set of infrastructure resources based on a migrate 238 routine.

The failover 232 routine is configured to checkpoint the state of an AI workload based on detection of a failure of the current infrastructure resources and to restore the AI workload on a new set of infrastructure resources, such that the AI workload recovers from the detected failure.

The scale 240 routine is configured to scale up and/or scale down the quantity, quality, and/or type of infrastructure resources being used to execute an AI workload. For instance, if additional infrastructure resources are available, an AI workload may be scaled up to make use of those additional infrastructure resources. Alternatively, if a new AI workload requires some infrastructure resources in use executing a current AI workload, the current AI workload may be scaled down to free up some resources for the new AI workload (e.g., the new AI workload may be associated with a higher priority or tier than the current AI workload).

The reliability subsystem 222 further includes a rendezvous protocol 246 configured to synchronize or otherwise enforce synchronization on AI workloads upon which the above-described routines are to be applied. For instance, if an AI workload is going to be migrated, the rendezvous protocol 246 is configured to synchronize the operations of the system such that the resources involved in the migration are not altered during the migration process. Such a rendezvous protocol 246 may include use of locking or forming a barrier such that processes that are otherwise not associated with the migration do not affect the migration inadvertently.

The AI accelerator provider models 224 are configured to enable the use of various software stacks, including third-party libraries 248 (e.g., libraries provided by tenants of the system 100) and/or first-party libraries 250 (e.g., libraries provided by the entity that manages the system 100). For instance, third-party libraries 248 may include a third-party-specific management library (ML) 252, third-party-specific multi-GPU communications library (MGCL) 254, and third-party-specific GPU library (GPUL) 256. Additionally, or alternatively, first-party libraries 250 may include a management library 264, a communication library 266, and/or a compiler toolchain 268. The runtime plane 204 enables tenants to make use of a wide variety of software stacks and associated libraries, including their own software stacks, to execute AI workloads within the described system 100 based on its extensible, flexible configuration.

Figure 3:
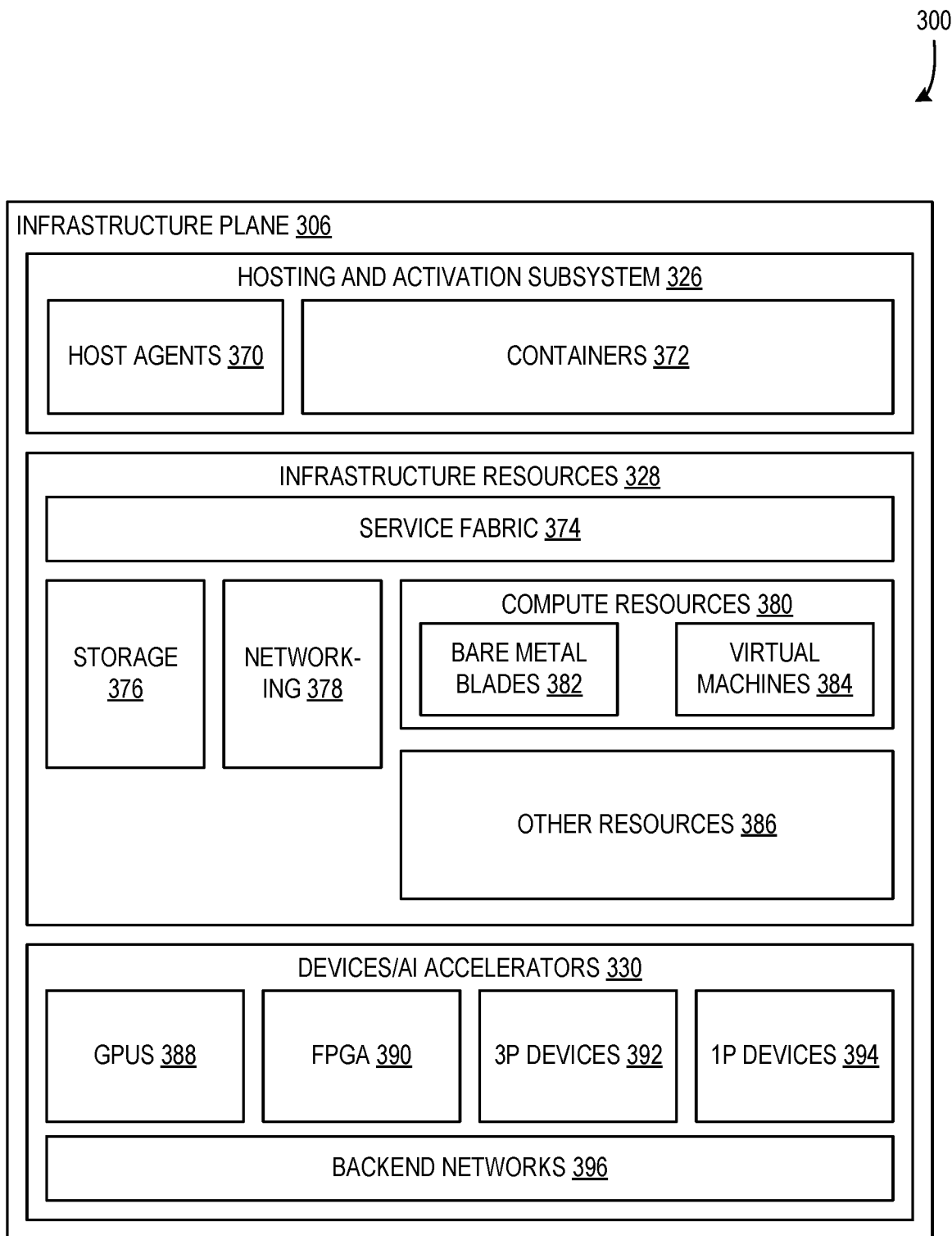
FIG. 3 is a block diagram illustrating an infrastructure plane of the system of FIG. 1.

FIG. 3 is a block diagram 300 illustrating an infrastructure plane 306 of the system 100 of FIG. 1 according to an embodiment. In some examples, the infrastructure plane 306 is substantially the same as the infrastructure plane 106 of FIG. 1, as described above. The infrastructure plane 306 includes a hosting and activation subsystem 326, infrastructure resources 328, and devices and AI accelerators 330.

The hosting and activation subsystem 326 includes host agents 370 and containers 372. The host agents 370 enable and organize the hosting of AI workloads on the infrastructure resources 328. The containers 372 (e.g., copy-on-write containers) keep different AI workloads (e.g., workloads from different tenants) separate and secure from each other, even when they are being executed on the same host. A host controlled by a host agent 370 may be a device that includes a set of infrastructure resources 328 that are configured to execute an AI workload or at least a portion thereof. Thus, by separating AI workloads into containers 372, some resources of a host may be used to execute an AI workload from one tenant, while other resources of the host may be used to execute an AI workload of another tenant at the same time. The containers 372 are configured such that the two separated AI workloads are prevented from interacting in any manner while they are being executed.

The infrastructure resources 328 include a service fabric 396 interface, storage resources 376, networking resources 378, compute resources 380 which may include bare metal blades 382 (e.g., physical processing devices) and virtual machines 384, and other resources 386 (e.g., integration infrastructure resources). In some examples, the infrastructure resources 328 are primarily provided for use by the entity that is offering services of the system 100 (e.g., first-party resources), but in other examples, the infrastructure resources 328 may also include resources provided by other entities (e.g., third-party resources) such as resources owned and used by tenants of the system 100. Such integration may be enabled via the third-party libraries 248 and other configurations described above.

The devices and AI accelerators 330 include GPUs 388, FPGA devices 390, other third-party devices 392, and other first-party devices 394. The described processes may further be enabled by backend networks 374 and/or associated devices. The execution of AI workloads may uniquely benefit from the use of GPUs 388, FPGAs 390, and/or other specialized hardware. In such examples, infrastructure resources 328, such as compute resources 380, may be linked to GPUs 388, for instance, such that a compute resource 380 provides instructions to the GPU 388 for how to execute steps of the AI workload. Such execution then takes advantage of specialized architecture of the GPU 388, such as the GPU 388 having many cores enabling parallel processing of data to a significant degree beyond the capabilities of the compute resources 380.

The backend networks 374 are configured to support a variety of non-uniform backend network architectures that may be envisioned by a variety of entities that use the system, such as first-party and third-party hardware manufacturers. Such backend networks 374 may be used to provide links between disaggregated topologies of compute nodes (e.g., compute resources 380) and hardware accelerators (e.g., GPUs 388).

Figure 4:
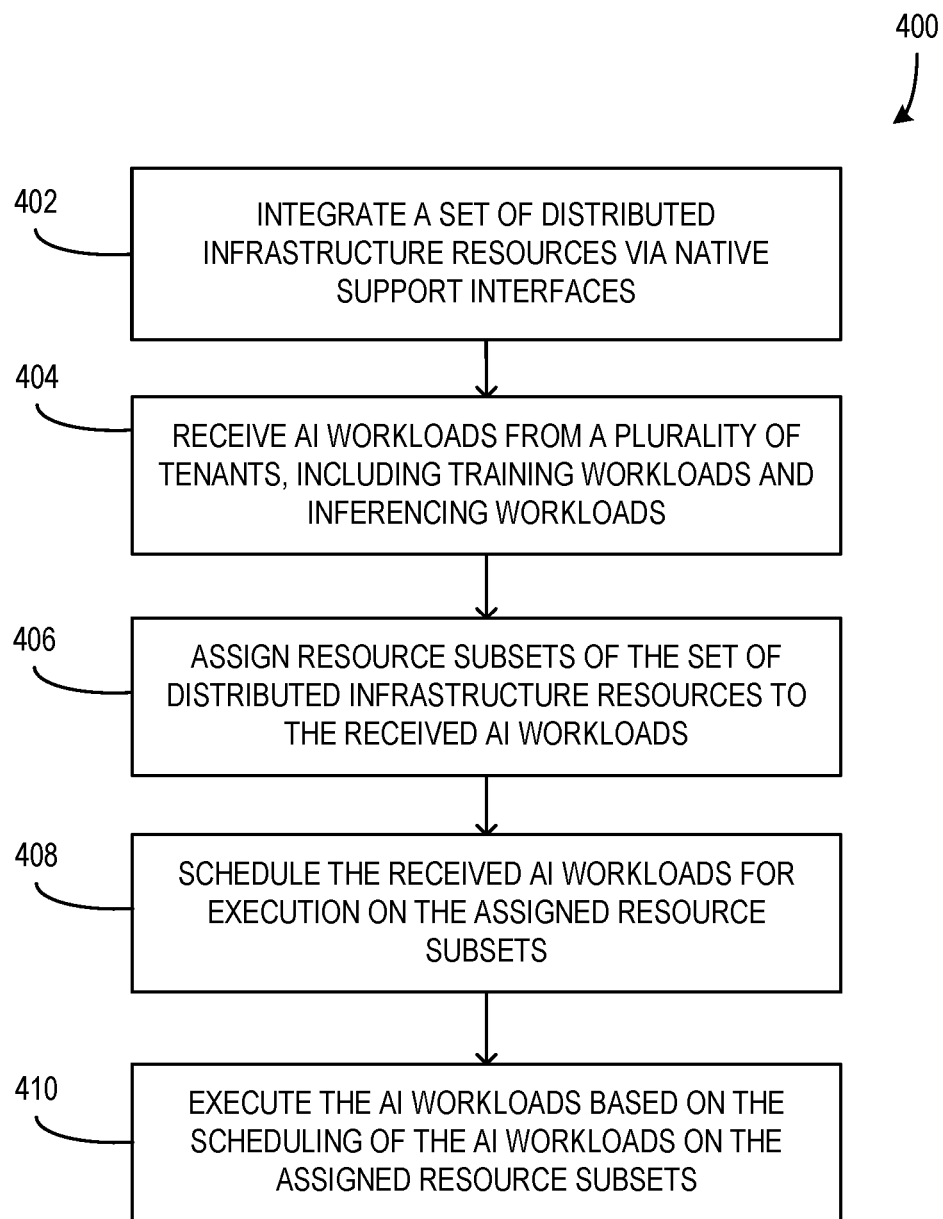
FIG. 4 is a flowchart illustrating a method for managing AI workloads in a cloud infrastructure platform.

FIG. 4 is a flowchart illustrating a method 400 for managing AI workloads in a cloud infrastructure platform according to an embodiment. In some examples, the cloud infrastructure platform of method 400 is a system such as system 100 of FIG. 1. At 402, a set of distributed infrastructure resources (e.g., hosting and activation subsystems 126, infrastructure resources 128, and/or devices/AI accelerators 130 of the infrastructure plane 106) are integrated into the cloud infrastructure platform via native support interfaces of those resources. In some examples, the native support interfaces may include interfaces and/or libraries of the providers of the resources, such as the third-party libraries 248 and first-party libraries 250 of FIG. For instance, a tenant of the could infrastructure platform may provide a subset of infrastructure resources for integration into the platform based on provided libraries, such that the tenant and/or other tenants of the platform may use those resources in execution of AI workloads.

At 404, AI workloads are received from a plurality of tenants, wherein the received AI workloads include training workloads and inferencing workloads. In some examples, the tenants provide AI workloads for execution on the platform via interfaces such as pluggable data planes 110 as described herein.

At 406, resource subsets of the distributed infrastructure resources are assigned to the received AI workloads. In some examples, the assignment of resource subsets to the AI workloads is performed by a global scheduling system 112 as described herein. Assigning the resources may include determining resource requirements of an AI workload and then identifying a subset of infrastructure resources that satisfy those requirements (e.g., an AI workload that requires the use of four GPUs in parallel may be assigned to a node of the system that has at least four GPUs).

Additionally, or alternatively, the assignment of a subset of resources to an AI workload may include rearranging of other AI workloads with respect to the subset of resources. For instance, assigning a resource subset to an AI workload may include saving a state checkpoint of an AI workload that is currently being executed on a first resource subset, migrating that AI workload to a second resource subset, restoring the saved state checkpoint of the migrated AI workload on the second resource subset, and then assigning at least a portion of the first resource subset to another AI workload. In some examples, such processes may be performed using routines of a reliability subsystem 222 as described herein.

At 408, the received AI workloads are scheduled for execution on the assigned resource subsets. In some examples, a global scheduling subsystem 112 generates a schedule for the AI workloads as described herein. Further, scheduling the execution of the AI workloads may include scheduling training workloads and inferencing workloads on the same infrastructure resources and those two types of workloads are multiplexed on those infrastructure resources (e.g., execution of a training workload is interspersed with execution of an inferencing workload on an infrastructure resource, such as a GPU).

Further, in some examples, AI workloads are associated with priorities or tiers that affect how resources are assigned and how AI workloads are scheduled to be executed on those resources. For instance, lower tier AI workloads may be more likely to be migrated to other resources to make space for higher tier AI workloads or higher tier AI workloads may be scheduled for a greater share of resource usage time than lower tier AI workloads, as described herein.

At 410, the AI workloads are executed based on the scheduling of the AI workloads on the assigned resource subsets. In some examples, the AI workloads are hosted in a hosting and activation subsystem 126 and then infrastructure resources 128 and/or devices/AI accelerators 130 are used to execute the AI workloads. For instance, assigning and executing AI workloads on resource subsets includes isolating the AI workloads from each other in secure containers, whereby AI workloads associated with different tenants are securely executed alongside each other (e.g., on resources associated with the same server).

Further, in some examples, executing AI workloads are monitored based on the performance of the cloud infrastructure platform and, based on that monitoring, the scheduling of the AI workloads is adjusted. The adjusting of the scheduling may include preempting an AI workload, migrating an AI workload, scaling up an AI workload, scaling down an AI workload, and/or load-balancing between two or more AI workloads. Such schedule adjustment may be performed by a global scheduling subsystem 112 or other component of the system 100.

Figure 5:
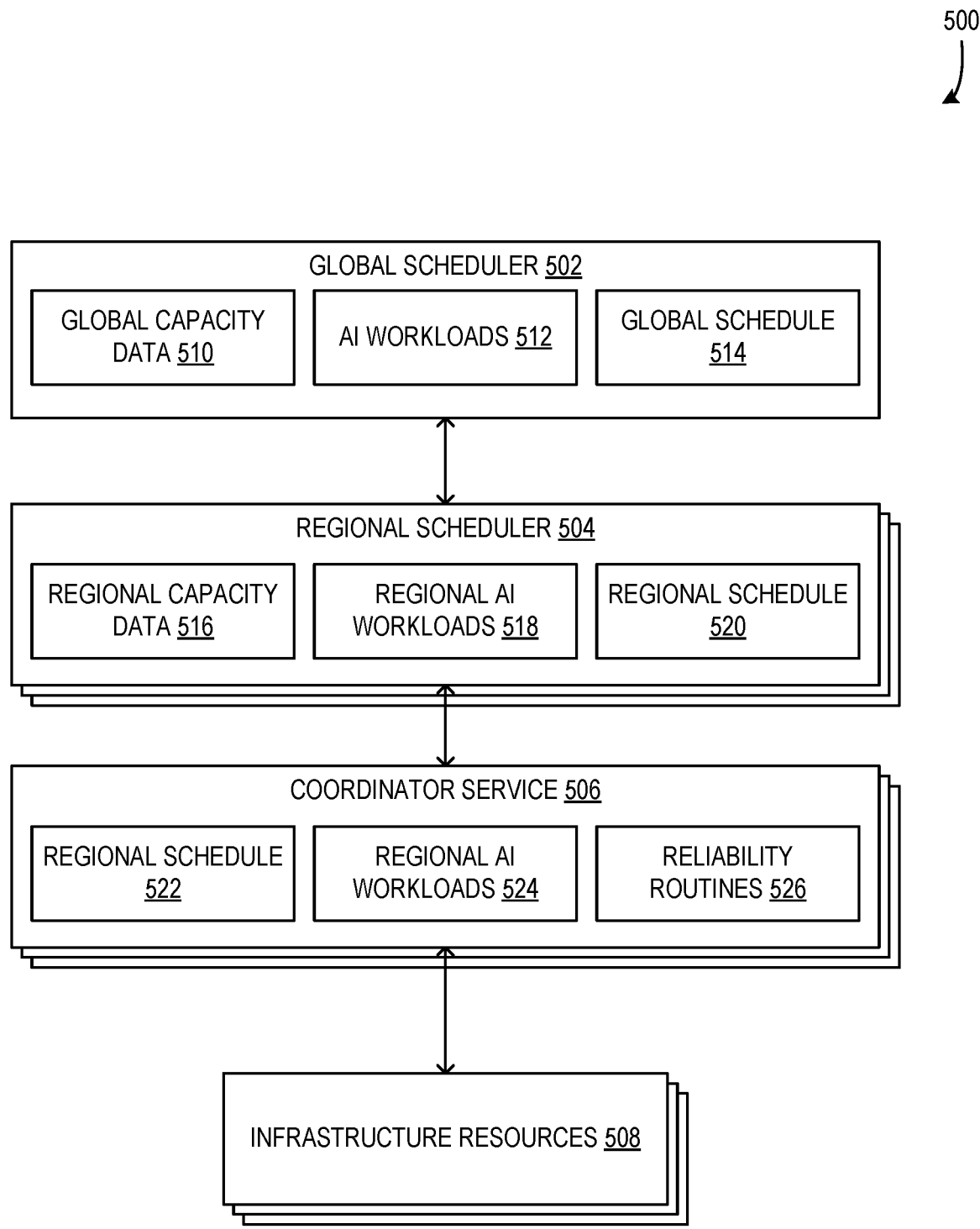
FIG. 5 is a block diagram illustrating a hierarchical scheduling subsystem configured for scheduling AI workloads.

FIG. 5 is a block diagram illustrating a hierarchical scheduling subsystem 500 configured for scheduling AI workloads 512 according to an embodiment. In some examples, the scheduling subsystem 500 is included in a system such as system 100 of FIG. 1. For instance, the scheduling subsystem 500 may be substantially the same as the global scheduling subsystem 112 of FIG. 1. The scheduling subsystem 500 includes a global scheduler 502 and multiple regional schedulers 504, coordinator services 506, and associated infrastructure resources 508. The global scheduler 502 is configured to use the global capacity data 510 (e.g., data indicating the current state of resource usage throughout the associated global infrastructure system, including resource usage in each region of the system) and AI workloads 512 to generate a global schedule 514 that schedules the AI workloads 512 to be executed on the infrastructure resources 508. The global scheduler 514 includes regional schedules 520 for each region of the system, which are then provided to the regional schedulers 504 associated with those regions (e.g., a regional scheduler 520 of a region is provided to the regional scheduler 504 associated with that particular region).

The regional schedulers 504 monitor the current regional capacity data 516 of the infrastructure resources 508 associated with the respective regions and that regional capacity data 516 is provided to the global scheduler 502 periodically or based on a pattern or a triggering event. Further, the regional schedulers 504 receive the regional AI workloads 518 associated with their regions from the global scheduler 502 from the set of AI workloads 512. The regional schedulers 504 are also configured to instruct the coordinator services 506 to execute the associated regional schedules 520 using the data of the regional AI workloads 518 (each region includes a regional scheduler 504 and a coordinator service 506).

The coordinator services 506 are configured to receive a regional schedule 522 and associated regional AI workloads 524 from an associated regional scheduler 504 and to use the reliability routines 526 (e.g., the routines of the reliability subsystem 222 of FIG. 2 as described above) to cause the regional AI workloads 524 to be executed using infrastructure resources 508 of the region based on the regional scheduler 522. For instance, a coordinator service 506 may be configured to allocate a subset of infrastructure resource 508 of the region to a regional AI workload 524 and cause that workload 524 to be executed on those allocated resources 508. Additionally, or alternatively, a coordinator service 506 may be configured to checkpoint, restore, migrate, and/or perform other reliability routines 526 to arrange the use of the infrastructure resources 508 according to the regional schedule 522.

Some implementations and examples resume training of a given DLT job in the same state on a different node as it was during checkpointing on an original (e.g., source or first) node running the DLT job (e.g., the same PC/instruction pointer, the same register state, call stack, etc.). The disclosed implementations and examples save the program state of the DLT job and restore the DLT job at that program state on another node (e.g., destination node or second node) of the cloud environment, switching the execution/control flow to the same instruction.

Unlike traditional programs, DLT jobs frequently use GPUs, and GPU states are not easy to migrate. There are different libraries for checkpointing programs running in CPUs. Aspects of the disclosure are operable with any functionality that enables checkpointing of an entire CPU address space. These checkpointing libraries have the ability to checkpoint a process, move it to a new machine, and start it. But these checkpointing libraries do not work for GPUs, because they have a lot of proprietary states that are embedded in the GPU that are not understood by the checkpointing. Because GPU drivers are proprietary and impossible for checkpointing libraries to handle arises from several factors.

The disclosed examples checkpoint the client process and restructure it in such a way so that the server process is stateless. Then, the server process may be stopped, in which case the job is migrated to another server node. When the server process is brought up at the other server node, the server process can be recreated. To bring the server process up to speed, some implementations and examples log calls to the GPU to recreate the same state of the GPU at the new server node. Also, before the initial server is disabled, some examples capture the memory of the initial server so that the same memory may be recreated at the new server node. For example, the server may be copied to disk, and then the same pointers may be allocated to the new server. The disclosed examples therefore allow useful state to be copied from the client, the GPU state to be copied from the server, and then only the useful client state is checkpointed, and the server process is recreated. The sequence may then continue at the new server node.

An example implementation is next described. However, those skilled in the art will note that this can be implemented in any cluster, with any container technology (not just Kubernetes). Also, aspects of the disclosure are operable with any scheduler (not just the ones described herein). Some examples use Kubernetes as a cluster manager with a custom scheduler that allocates jobs to nodes. In this example, jobs are submitted as Docker containers. A scheduler was implemented in Scala code, using the Akka Actors library for concurrency and remote procedure call (RPC or gPRC) for performing remote procedure calls.

In some examples, there are four main modules: manager, scheduler, executor, and client. Manager exposes a REST API and a gRPC endpoint for the clients to connect to the scheduler. Scheduler makes decisions like placement, migration, ticket allocation, management of bonus tokens, trading, etc. In some examples, there is a global executor for performing gang scheduling of multi-server jobs and a local executor for each server in the cluster and together they are responsible for running the jobs on servers in proportion to the tickets allocated by the scheduler. The client, which runs inside the container alongside the job, also exposes a gRPC endpoint and is responsible for receiving commands from the executor to perform operations like suspend/resume, checkpoint/migrate, report job metadata, and report the status of the running jobs.

A mechanism utilized by some of the disclosed examples is the ability to migrate jobs between nodes. In order to migrate jobs, DLT jobs are checkpointed on-demand and then resumed on a different node. Some DLT jobs are written with checkpoint capability so and resumed from a previous checkpoint if it exists. Typically, DLT jobs that use a checkpoint only checkpoint every epoch. An epoch can last several hours or more. While such checkpoints are useful to guard against occasional server failures, examples require much more fine-grained checkpointing for fairness and technical efficiency and to avoid losing precious compute time. Thus, an automatic, on-demand checkpoint mechanism is implemented. Once checkpointed, the DLT job may then be migrated from the original node to the destination node.

Figure 6:
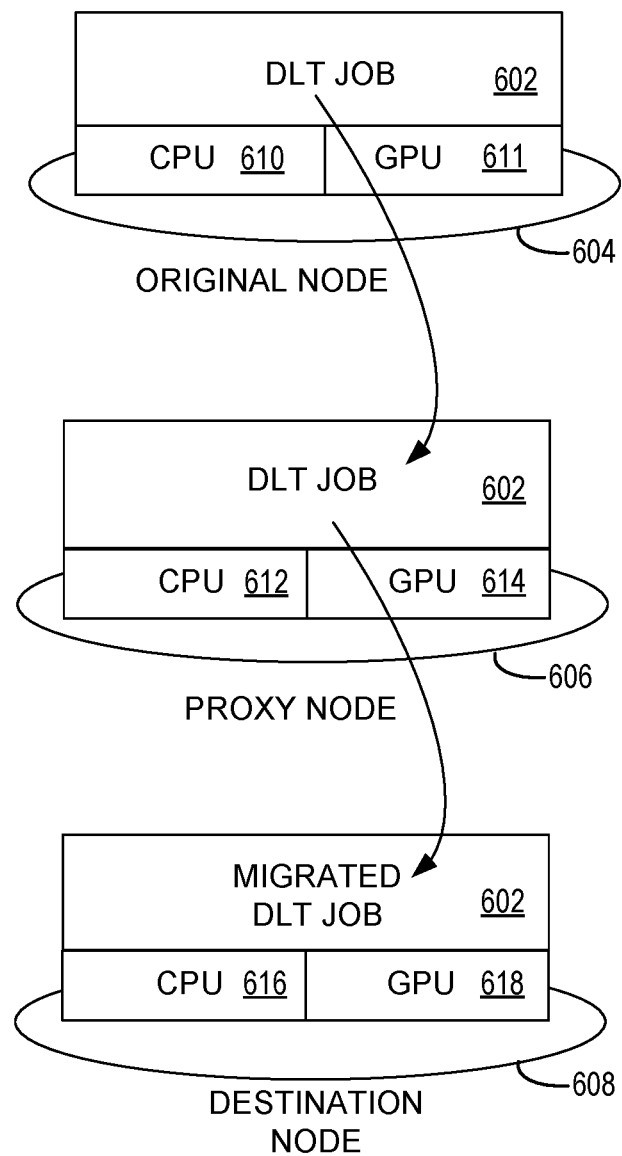
FIG. 6 is a block diagram illustrating a proxy-based dual-process architecture configured for checkpointing various operational parameters of a deep learning training (DLT) job so that the DLT job may be migrated from a source node to a separate destination node.

FIG. 6 is a block diagram illustrating a checkpoint service 600 configured for checkpointing various operational parameters of a DLT job 602 so that the DLT job 602 may be migrated to a separate destination node 608. The original node 604 includes one or more CPUs 610, the proxy node 606 includes one or more CPUs 612 and GPUs 614, and the destination node 608 includes one or more CPUs 616 and GPUs 618. The disclosed embodiment references different nodes, the original node 604, the proxy node 606, and destination node 608. These nodes 604-608 may be any type of server, computer, VM, or the like. Example computing devices that may function as each of the original node 604, the proxy node 606, and destination node 608 are discussed in FIG. 12 below as computing device 1200.

Figure 7:
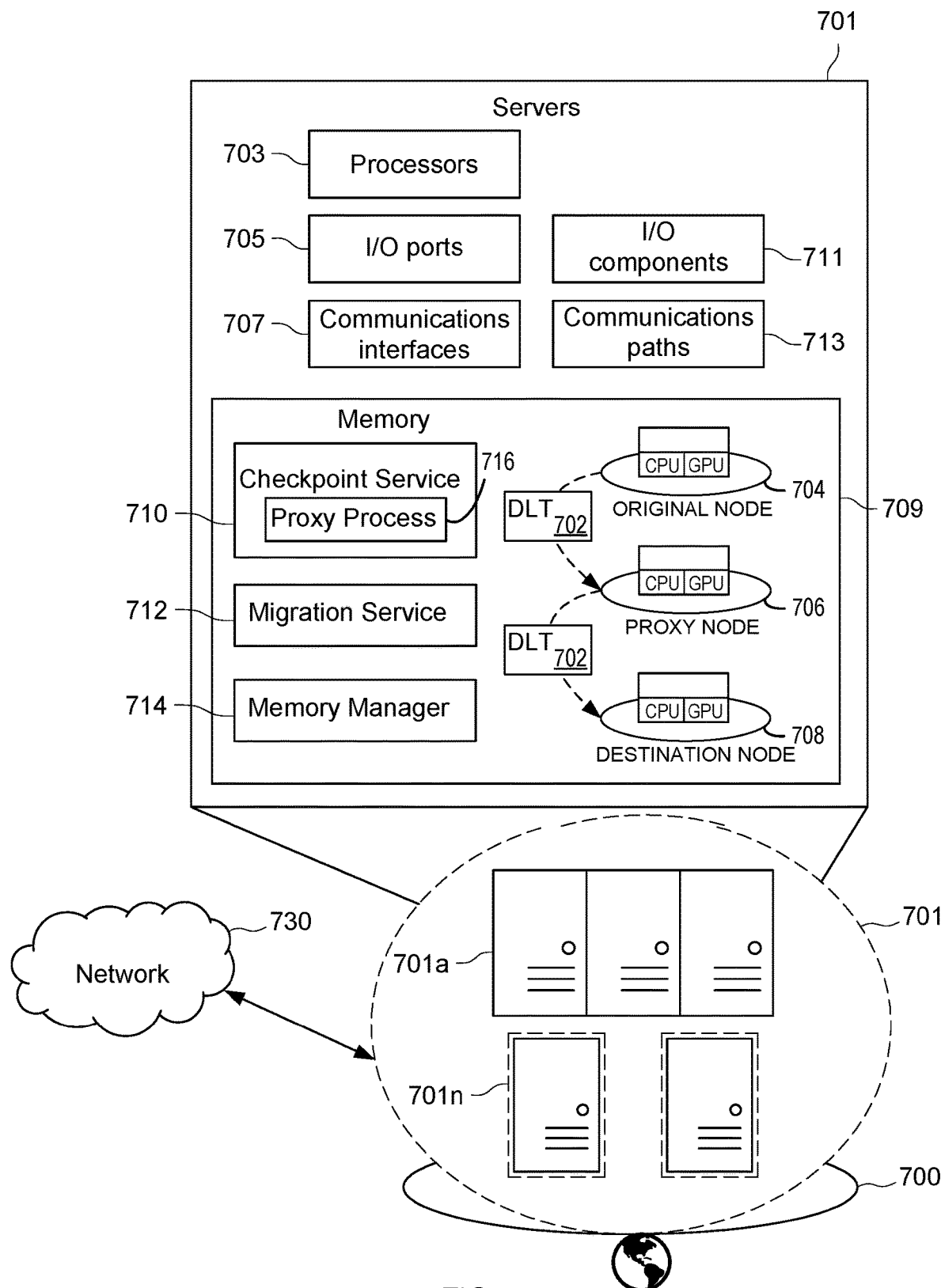
FIG. 7 illustrates a block diagram of a planet-scale AI infrastructure network environment implementing a migration service for moving DLT jobs from a source node to a destination node.

FIG. 7 illustrates a block diagram of a planet-scale AI infrastructure network environment (network environment 700) implementing for migrating DLT jobs 702 from an original node 704 to a destination node 708 using a proxy node 706, according to an embodiment. Numerous computing devices communicate with the cloud environment 700 over a network 730. Cloud environment 700 represents a cloud infrastructure made up of numerous computer servers 701, which may be any type of server or remote computing device, either as a dedicated, relational, virtual, private, public, hybrid, or other cloud-based resource. As depicted, servers 701 include a mixture of physical servers 701a and virtual servers 701n, the latter of which are set up as VMs running inside of cloud environment 700. For the sake of clarity, these physical servers 701a and virtual servers 701n are collectively discussed as "servers 701," unless otherwise indicated. In some implementations and examples, the cloud environment 700 is operated as a large-scale (e.g., planetary) cloud environment (e.g., COSMOS developed by the MICROSOFT CORPORATION®), handling large amounts of data, such as an exabyte or more. Such implementations and examples may operate the various services 701 partially or wholly across the globe.

Servers 701 include or have access to one or more processors 703, I/O ports 705, communications interfaces 707, computer-storage memory 709, I/O components 711, and communications paths 713. Server topologies and processing resources are generally well known to those in the art, and need not be discussed at length herein, other than to say that any server configuration may be used to execute the tuning service referenced herein.

Memory 709 represents a quantity of computer-storage memory and memory devices that store executable instructions and data for migrating DLT jobs 702 from the original node 704 through the proxy node 706 to the destination node 708. Specifically, the memory 709 stores instructions for a checkpoint service 710 that captures current operational data of the DLT job 702 being migrated and a migration service 712 that moves the DLT job 702 from the original node 704 to the destination node 708 using the disclosed techniques referenced herein. Further still, memory 709 stores executable instructions for a memory manager 714 that handles allocation of the DLT jobs 702 to different memory locations throughout the network environment 700. The checkpoint service 710, migration service 712, and the memory manager 714 may be implemented in software, firmware, hardware, or a combination thereof in various implementations and examples.

To support job migration, PyTorch and TensorFlow frameworks are slightly modified by the migration service 712, in some examples. In other examples, other frameworks are used. Some implementations may handle unmodified user code, requiring somewhat minor changes to both the frameworks. Although generic process migration tools exist, but they cannot handle processes with GPU state. In some implementations, a proxy process 716 within the checkpoint service 710 is forked with a main process. Some or all GPU calls made by the proxy process 716 are intercepted and directed to the proxy process. This way, the address space of the main process remains CPU only and can be easily checkpointed. In some implementations and examples, the proxy process 716 performs the following operations: 1) translating all GPU handles such as stream, context, etc.; 2) keeping a log of all state changing GPU calls, so that they can be replayed upon a restore; and 3) memory management of GPU memory. The memory manager 714 maps the virtual address space to the physical GPU address space in a consistent manner across migration, so that pointers to GPU memory remain completely transparent for the parent process. Upon checkpoint, the proxy's memory manager copies the GPU state to the parent process's CPU memory and dies. The parent process may then be migrated. Upon restore, the proxy process 716 replays the log of state changing GPU calls and copies the GPU memory back. All communication between proxy and the parent process is handled via shared memory with negligible overhead, in some examples. The proxy implementation remains unchanged between PyTorch and TensorFlow and requires only minimal modifications to the actual frameworks.

Cloud resource overhead (e.g., CPU, GPU, memory, VM, etc.) for suspension-and-resumption (suspend-resume) is similar as well, e.g., about 100-250 milliseconds (ms) depending on the size of the model. In some implementations, the migration service 712 optimizes migration overhead by implementing a three-phase context switch called the suspend-preload-resume. In some examples, when the migration service 712 is notified to suspend, the migration service 712 completes suspension within about 100 ms by copying GPU memory (using the proxy process 716) at the end of a mini-batch of training to CPU memory of a parent process. This allows the scheduler (global or regional) to run another DLT job 702 on the GPU of the original node 704.

If the DLT job 702 is to be migrated across servers 701 (i.e., from original node 704 to destination node 708), the disclosed schedulers perform a checkpoint on the DLT job 702, using the checkpoint service 710, and the migration service 712 restores the DLT job 702 on the destination node 708. The migration service 712 may be configured to wait for a preload notification. When the migration service 712 receives the preload notification, the migration service 712 sets up the state on the new GPU(s) of the destination node 608 by replaying the log of all stateful operations (e.g., GPU state and/or the CPU state), but does not resume. Thus, preload hides a latency (e.g., 5 seconds) for initialization of the GPU context.

When the migration service 712 is notified to resume, the migration service 712 copies the data back to GPU memory of the GPU on the destination node 608, which (in some examples) takes about 100 ms. The migration service 712 quickly resumes the GPU computation on the destination node 708. Thus, migration mostly occurs in the background while other DLT jobs 702 utilize the GPU.

The GPU state is, in some implementations and examples, tracked inside the GPU of the original node 704 through close-source proprietary software inside the GPU and the CPU. For example, a user may have a PyTorch program that runs partly on a CPU and that ships computations to the GPU—e.g., the more expensive parts of the job are often run on the GPU. The state of the DLT job spans across both the CPUs and in the GPUs, because some computations are done on the CPUs while others are done on the GPUs. Checkpointing libraries do not know what to do with tracking the states in the GPUs, which really pollutes the address space in the CPU. To get around this, some of the examples described herein keep the host address space of CPU clean by implementing a split-process architecture through which the DLT job 702 runs. When the GPU is called, the GPU call is not executed in that address space. Instead, the GPU call is executed in a separate process (aka a proxy process) that interacts with the GPU. This ensures that only the address space of the proxy process gets polluted while the host process stays pristine.

The disclosed implementations and examples provides a highly scalable AI infrastructure. The checkpoint service 710, migration service 712, and memory manager 714 are designed to scale across hundreds of datacenters and tens of thousands of accelerators with training models of trillions of parameters. The service may be configured to cross-geographical boundaries as well. The architecture is also capable of treating training jobs and inferencing services as equal when they originate from data centers as well as on premises sources.

Some implementations use the checkpoint service 710 to provide checkpointing for migrating a DLT job 702 by performing: (1) intra-worker completeness, and (2) inter-worker consistency. For intra-worker completeness, the checkpointing mechanism operates so that, after the DLT job 702 is migrated to the destination node 708, the state upon which a worker container depends (e.g., files, environment, child processes, etc.) are accessible to the worker container under the same references, locations, and names that existed in the original node 704. For inter-worker consistency, a migration application (which is also implemented through any combination of software, firmware, or hardware) generates a barrier mechanism that is implemented through taking a distributed snapshot of all workers in the DLT job 702 to be consistent across workers, therefore making the DLT 702 job able to be resumed from the same consistent state at the destination node. In some implementations, the checkpointing mechanism and the migration application operate such that the DLT job 702 being migrated does not have any external notion of cross-worker consistency that is outside what is known to the barrier mechanism.

More specifically, intra-worker completeness may be breached through the local file system, through unsafe system calls, and/or through environmental variables. For instance, the original node 704 installs software on its local OS, either independently or for the DLT job 702. Yet, the OS of the destination node 708 may not have such software, making things problematic after migration of the DLT job 702. In another example illustrating an unsafe system call, suppose the original node 704 changes a system configuration through system calls performed at "init" time, but on the destination node 708, such changes are not performed, thus violating the expectation that the changes hold throughout the DLT job 702. In another example, illustrating an environmental variable interrupting intra-worker completeness, the original node 704 may set environmental variables used by other threads but that are not set by the destination node 708.

Additionally or alternatively, inter-worker completeness may be breached by out-of-band communications between the original node 704 to exchange state information, or through writes to other external memory stores that publish the current state of the DLT job 702—and, hence could see unexpected behavior during a rollback from checkpoint. To alleviate this, a barrier mechanism is used to ensure consistency of communication happening through designated libraries. Further still, there are other constraints that the DLT job 702 meets, such as single GPU per worker, control over topology/rank mapping, etc.

Some implementations deal with potential non-compliant DLT jobs 702 in the following manner. Initially, some implementations classify all DLT jobs 702 as being deemed safe and compliant for migration unless there is evidence to the contrary. Violations may be automatically fixed by virtualization and then replayed. Additionally or alternatively, an exhaustive list of checks catch possible violations of assumptions. These checks are complete (e.g., no false negatives) or conservative (e.g., few false positives where a compliant DLT job 702 is misclassified as non-compliant). In cases where unfixable violations are detected (specified as DENY in the mechanisms below), clear information on how the DLT job 702 may be made compliant (e.g., precise reasons along with debug information such as stack trace to the user) is provided, in some implementations and examples. Non-compliance is detected as early as possible, so that a user does not spend a lot of resources to later find out that the DLT job 702 is non-compliant. In some implementations and examples, non-compliant DLT jobs 702 are run without the special features, such as preemption, thus incentivizing users to make their jobs compliant. In general, most (e.g., 95%) DLT jobs 702 are compliant (either no violations, or fixable violations), and for the bulk of the rest, this disclosure provides a framework to make them compliant.

There are various scenarios that violate the assumptions of checkpoint-restore. In some implementations, each scenario is tagged with either ALLOW (the checkpoint service 710 handles it transparently and hides the violation) or DENY (the check checkpoint service 710 flags the DLT job 702 as non-compliant). These various scenarios include various codified operations for the checkpoint service 710 and the migration service 712 to execute for a local file system, environmental variable dependencies, and unsafe system calls. Each is discussed in more detail below.

1. Local File System (Strategy: ALLOW)

Some implementations implement a job worker script that downloads and installs arbitrary packages to the local file system. When the DLT job 702 moves to a different machine (to destination node 708), these files may not be present, thus violating the intra-worker completeness requirement. Implementations address this by allowing a user script to provide a "container-init" file that lists these packages, or by allowing custom container images. Despite these techniques, however, a non-conformant script may still perform inline installations outside the above mechanisms. Implementations handle this by interception of file system calls (in particular, open( ) in writable mode). When any local file to the container file system is opened in writable mode, it is a violation. While one option is to flag such a job as non-compliant, it is handled transparently (hence ALLOW). The interceptor keeps track of the set of these files opened (along with metadata—e.g. access permissions), and then the migration module includes these files along with the checkpoint and GPU dump—at the destination node 708, these files are restored first before performing a restore. With this functionality, the disclosure in some examples does not even need the option (and resultant complexity) to support an "init script," as it simulates the effect of the user exhaustively enumerating all files written to the local file system through the init script. Checkpoint size is not an issue because, similar to a de-dup of GPU dumps, checkpoint size is deduplicated across nodes as all nodes are likely installed the same set of files.

Note that in addition to the writes to the local filesystem, there is a rare case of some package installations affecting the in-memory state of the node (e.g., affecting the OS state).

In some implementations and examples, local file system access is managed at the checkpoint of a DLT job 702 container by saving all file system changes during a last run of the DLT job 702 on the original node 704 and restoring the saved file system changes at the container of the destination node 708 where the DLT job 702 is migrated. This may be done using at least two example approaches. In the first approach, LD_PRELOAD is used to intercept libc calls related to the file system and maintain a log used to help in the checkpoint/restore processing. The second approach performs a diff operation and takes the diff folder of a union file system. Both are discussed in more depth below.

Relative to the first approach, LD_PRELOAD is used to track file system changes. Some implementations and examples intercept the following libc APIs:

fopen, fopen64: file creation or modification;
open, open64, openat, openat64: file creation or modification;
creat, creat64: file creation;
symlink, link: symlink, link creation;
rename, renameat, renameat2: file/directory rename or move; and
mkdir: directory creation.

The LD_PRELOAD is added to a DLT job 702 training job command line to intercept the above calls for the whole process tree of the DLT job 702, as environmental variables are inherited by the sub-processes. The interception logs the source/destination path and the file system operations on them together into a file. To avoid write contention and the issue with write atomicity, each process has its own log file. Some examples put all log files into a same directory, with process-id as log file name.

The log file may be created with an O_APPEND to guarantee atomic append, per POSIX. If the O_APPEND flag of the file status flags is set, the file offset shall be set to the end of the file prior to each write and no intervening file modification operation shall occur between changing the file offset and the write operation. But this may not apply to multiple processes.

In addition, signals interrupt the system call, and write( ) fails with none or partial content being written.

In some examples, to support change to base image, the following additional libc APIs are intercepted:

remove, unlink, unlinkat: file or link deletion.
rmdir: directory (must be empty) deletion.
setxattr, chmod, chown, utime/utimes, . . . : changing attributes, mode, owner, time, etc.

At checkpoint time, per-process log files are accumulated, in some examples. Each file operation intercepted is logged path, flag, optional-path2, with path being the file/directory path, and flag could be 'x' (deletion), 'm' (new or modified). For APIs like rename, two log entries are captured: one marks the old path as 'x', and one marks the new path as 'm'. In addition, another flag 'l' and optional-path2 is used to mark the hard-link relationship of the two files. All the per-process log files are merged into one.

Most APIs only impact single file or directory, except rename (as well as renameat, renameat2), which could rename or move a directory, impacting its whole sub-tree. With this merged log, the entries with same path are grouped together, and perform the following processing when writing to checkpoint store. If the path is a file existing in the current file system, no matter its flags, put it into the changeset. If the path is a directory existing in the current file system, no matter its flags, put its whole sub-tree into the changeset. Otherwise, i.e. the path doesn't exist in the current file system, skip.

For example, if the container created a file/root/dirA/foo, and there is also a rename moving dirA to/tmp, the following log items are created:

/root/dirA/foo, 'm'
/root/dirA, 'x'
/tmp/dirA, 'm'

In some implementations and examples, the sequence does not matter to the algorithm, and the log sequence is not guaranteed to be the same as the real file system change sequence, without paying a large performance cost for locking. So in the interception code, without any lock, log items are written, and then calls are made into original libc API. They are not atomic. For /root/dirA/foo, by checking the file system it does not exist, so it may be skipped. For /tmp/dirA, it exists in the file system, so its whole sub-tree, including file foo, is put into the changeset. Note that, in some implementations and examples, the algorithm works if the rename actually happened before the file creation.

Meanwhile, all of the path with the 'x' flag into a file, and name it as 'xlog' for restoration time processing. These paths are deleted by the container, some of which may be new files that are deleted later, and some might be files in base image. In some implementations and examples, such log is required to assist the restoration only when changes are needed to the base image.

When the DLT job 702 is restored on the destination node 708, if the supporting base image changes, embodiments iterate through xlog, and delete the path in the base image. Then, the changeset (copy with overwrite, preserving all metadata) is directly applied into the container root file system.

As described above, some implementations and examples track the creation of hard-links. During checkpoint, some implementations and examples have sets of linked files, e.g. if A is linked to B, and C is linked to A, resulting in a set of linked files {A, B, C}. Yet, the files could get deleted, or deleted and re-linked. So the final file system prunes or splits such sets according to their inode values.

However, it may not be known how the set of linked files is indirectly linked with base image, e.g., files that are not in the log at all. For example, if B was in a base image and already linked with another file D in base image, and B got deleted. So {A, C} lost a link to D upon restore. Therefore, once the source of a link is deleted, some implementations and examples do a whole file system traversal to find if there are any missing files in the base image that are linked (via inode number); though, not in a log, which, is an expensive operation.

With overlay graph driver, when the container is cross-linking files from writable layer to base image, say, A (in writable layer) to B (in base layers), B are copied up into writable layer breaking all its existing hard-links in base image if any, and changes to the inode number are noticed. With this semantics already happening at overlay, traversal is avoided for any hard-link operation. Instead, implementations and examples add the two files into the changeset if existing in final file system (and link them if using the same inode).

For the second approach, overlay2 is the default file system used by docker/moby for the container root file system, in some implementations and examples. An overlay-filesystem is one filesystem overlayed on top of the other. That is, it is a sequential stack of layers, each layer is the delta changeset on top of the layer immediately beneath it.

Some implementations and examples use upperdir since it is exactly the writable layer of docker container—no more, no less. At checkpoint time, some examples tar the directory of writable layer upperdir as is to get the changeset. For new files or directories, overlay2 puts them directly in directory of writable layer. For file modification of base image, overlay2 does a "copy up" into writable layer, and allow them to be modified. For deletion, overlay2 put a tombstone using a character device of major/minor 0 with same name of the deleted file/directory, "whiteout" in overlay2 terms.

Sometimes the container might delete a directory in base image, and later create a new directory with the same name.

For example, in base image, there was DirA with two sub-items File1 and File2. The container deleted the whole directory and created a new DirA with one sub-item File3. In diff of writable layer, upperdir, Overlay2 has no way to mark DirA as "whiteout" and at the same time mark DirA and DirA/File3 as new/modified. Instead, it uses an extended attributes "trusted.overlay.opaque" on DirA to represent that it's an opaque directory shadowing all sub-items from base image, e.g., File1 and File2 should no longer show up in DirA.

Some implementations and examples also desire to de-dup the files in writable layer of all the containers for one job or even globally, since they might install same Python or Ubuntu packages.

At restore time, two methods of implementation are used to apply the tar file and restore the container root file system as it was at checkpoint time. The first method applies the tar file from outside of the docker container. At restore time, after the container is created but before the job process is resumed, the directory of writable layer can be found via docker inspect command. Untar-ing the tar file into this directory, the container root file system would be restored.

In the second method, the tar file is applied inside the docker container. The overlay's representation of changeset is interpreted and applied by the code running inside the container. Basically, a Breadth First Search of the directory is done from the extracted tar file. For each item during the BFS:

1. If its name is "." or "..", skip;
2. If it is a whiteout, e.g., character device, the item of the same path in container root file system is deleted;
3. If it has extended attribute "trusted.overlay.opaque," the item is deleted, and the whole sub-tree rooted at this item in container root file system;
4. If it is a directory, the directory of same path in the container root file system, and sync up all attributes, modes, times, etc.;
5. If it is a file, it is copied over into the container root file system, preserving all attributes, mode, times, etc. The copy of extended attribute of "trusted.overlay.opaque" would fail (as overlay2 file system does not allow such attributes within its file system to confuse itself), which is fine and the error can be ignored. Steps 2 and 3 are only required to support changes to the base image, in which case, modification of base image files is handled the same way as the new files by overlay2 in writable layer representation. The benefit of this method is that it does not require host involvement—the restore is executed by the code or script within the container. The higher layer could just spin up the container from base image, passing in the tar file, and with additional logic in entrypoint.sh, apply the tar file using the above algorithm before resuming the job process. Either method may be used, but the algorithm in the second method for interpreting the changeset of overlay2 and applying them to container root file system is useful for merging two changesets needed by the first method to support optimization for incremental checkpoint and make sure only one changeset for a job is maintained.

The design described in this disclosure for container local file system changes could be reused for output file-system too, though there are some differences that need to be further addressed. The output file-system is shared by multiple workers of the job—the log merging may be done just one worker. As general rule, changing files not created by the worker can be tricky, unless a copy of the file is kept before the change, but that is extra logic that local file system does not have. For the output file system, ideally, the worker is not touching existing files. And in such case, identifying the folder where the new files are located is actually sufficient, and every time such folders are enumerated.

For periodic checkpoint, each time the checkpoint service 710 has to process all the changes since the DLT job 702's initial execution. This could be optimized to only process the changes between the immediately previous checkpoint and the current checkpoint.

Also, for the second method, implementing incremental checkpoint in is a little tricky—mainly in how to get the delta changeset in context of docker. To do so, a new staging container is created with a base image (but never run). Docker builds up the overlay2 layer structure (though does not mount it), and the directory of writable layer is found via docker inspect command. By untar-ing the tar file into this directory, and "docker commit" this staging container, the desired image is achieved.

Of course, from hosting layer's perspective, the container to be resumed should no longer use the base image, but this newly created local image, which introduces complexity since Service Fabric application/service manifest would require change. Though, a fixed name may be used all through for the continuum of a specific job container, as long as the name chosen is unique on hosts among different job containers.

Periodic checkpointing may result many read-only layers, which might not be desired—in terms of too many layers in overlay2 file system. This is resolved, in some implementations and examples, through selectively merging any number of consecutive layers into one. The merge cannot be done by simply building up the read-only image overlay directory structure (from base image to the layer before the start layer to merge), and extracting the tar files sequentially into its writable layer.

For example, among earlier checkpoints the container deleted a directory A, while in a later checkpoint, the container created a directory of same path A. Two changesets are created, one says A is deleted (represented by a tombstone character device) in the tar file in storage, and the other one says A is a new directory. The merged changeset should say A is a directory with extended attribute "trusted.overlay.opaque", instead of first creating an A character device and then over-writing it with a normal directory A. The algorithm described above is used for merging.

A blob storage is used to store file content. All the files are put within a storage container and extended to a hierarchical structure. The File Store could be one per job so the de-dup happens in the scope of all the containers of this job; or the File Store could be global, so the de-dup happens in the scope of all containers of all jobs.

Each file is content-addressable in the File Store, by using the hash value of content as its file name. Any hash algorithm should work, MD5, SHA256, etc. Theoretically conflict could happen but practically rarely does, except via deliberate hack.

For each file in the checkpoint changeset, preserved its attributes, modes and times are preserved. In addition, the following operations are performed change its file name to be the original file name appended with its content hash; upload the file content to File Store if not already existing; truncate the file size to 0. That is, in the end, the changeset tar file has right directory structure of all changed files and directory, their meta data, and all files are truncated, with file name containing reference to its content stored in File Store.

During restoration on the destination node 708, the tar file is extracted. Then, a Depth First traversal of the extracted directory tree is performed. As described before, for each directory or file, there are metadata like attributes, etc. and for each file, and content-hash string are embedded in its file name. For the file with the content-hash string in the file name, the file content from File Store is retrieved and copied over to file system. Please note that when creating a new file, or changing the file content of an existing file, the file system updates the modified time of its parent directory. That is the reason to do the DFS traversal. For both the file and directory, the target file or directory is set with the metadata like attributes, modes, modified time, etc. as the counterpart in the tar extracted directory tree.

In addition to the file system, some implementations and examples also recreate the IP network parameters being experienced on the original node 604 to the destination node 608. To do so, implementations and examples transparently allow socket (transmission control protocol (TCP)/Internet protocol (IP), user data protocol (UDP)/IP, Raw IP, etc.) access for managed execution, e.g., at the checkpoint of a job container. Network connections during the DLT job 702's last run are saved, and are also able to restore them when the container migrates and resumes on the destination node 708. Example intercepted APIs are provided below, without limitation:

```
int socket(int domain, int type, int protocol);
int getsockopt(int sockfd, int level, int optname, void *restrict optval, socklen_t *restrict optlen);
int setsockopt(int sockfd, int level, int optname, const void *optval, socklen_t optlen);
int bind(int sockfd, const struct sockaddr *addr,socklen t_addrlen);
int listen(int sockfd, int backlog);
int accept(int sockfd, struct sockaddr *restrict addr, socklen_t *restrict addrlen);
int accept4(int sockfd, struct sockaddr *restrict addr, socklen_t *restrict addrlen, int flags);
ssize_t recv(int sockfd, void *buf, size_t len, int flags);
ssize_t recvfrom(int sockfd, void *restrict buf, size_t len, int flags, struct sockaddr *restrict src_addr, socklen_t *restrict addrlen);
ssize_t recvmsg(int sockfd, struct msghdr *msg, int flags);
ssize_t send(int sockfd, const void *buf, size_t len, int flags);
ssize_t sendto(int sockfd, const void *buf, size_t len, int flags, const struct sockaddr *dest_addr, socklen_t addrlen);
ssize_t sendmsg(int sockfd, const struct msghdr *msg, int flags);
int shutdown(int sockfd, int how);
int close(int fd);
int epoll_ctl(int epfd, int op, int fd, struct epoll_event *event);
int poll(struct pollfd *fds, nfds_t nfds, int timeout);
int ppoll(struct pollfd *fds, nfds_t nfds,const struct timespec *tmo_p, const sigset_t *sigmask);
int fileno(FILE *stream);
int fstat(int fd, struct stat *statbuf);
int getpeername(int sockfd, struct sockaddr *restrict addr, socklen_t *restrict addrlen);
int getsockname(int sockfd, struct sockaddr *restrict addr, socklen_t *restrict addrlen);
int fcntl(int fd, int cmd, ... /* arg */);
int ioctl(int fd, unsigned long request, ...);
ssize_t read(int fd, void *buf, size_t count);
ssize_t write(int fd, const void *buf, size_t count);
Also, fdopen transforms file/socket descriptor into FILE, which might have to intercept APIs related to such stream, for example:
FILE *fdopen(int fd, const char *mode);
size_t fread(void *restrict ptr, size_t size, size_t nmemb, FILE *restrict stream);
size_t fwrite(const void *restrict ptr, size_t size, size_t nmemb, FILE *restrict stream);
void clearerr(FILE *stream);
int feof(FILE *stream);
int ferror(FILE *stream);
```

Job-level File Store does not need garbage collection as it just deletes the File Store once completed. In extreme cases, if the containers of the job are really running for a long time, and keeping deleting files, garbage collection is leveraged for optimization. However, garbage collection is a must for Global File Store. For example, in parallel with the file in File Store, e.g. a file 621c19197665 has reference from two jobs, with job id 7b64 and c090, two additional empty files 621c19197665.7b64, 621c19197665.c090 are created to represent the reference links. It is trivial for the checkpoint code to add or remove these references, but it helps the garbage collector. With these reference link files, the main task of the background garbage collector is to scan them and remove all the references from the jobs that have already completed. If the reference count of a file drops to 0, it is removed from File Store.

APIs that are shared by file operations are intercepted, as well as operations on other types of sockets, e.g., poll, fileno, fstat. Therefore, the space of virtual file-descriptor for socket does not have any overlapping with the file descriptor space of the training job. When the user creates a new socket, two handles are created. The first can be opening an arbitrary file (say/dev/null), which is not really used. The second is the real socket returned by operating system (OS). The first handle is returned to the user as the virtualized handle. Since it is something returned by OS, it has no conflict. At checkpoint time, the second handle is closed (the real socket), but the first one is kept open. After restore, the socket is re-created and associate it with the virtual (the 1st) handle. Again as the virtualized handle has not been closed, there is no conflict. When the user closes the socket, both handles are closed.

Currently, the interceptor code monitors SIGTRAP as trigger to initiate the checkpoint of existing sockets, before a CRIU checkpoint is to be issued. For restore, after checkpoint/restore in userspace (CRIU) restoration, the current interceptor code monitors SIGURG to initiate the restoration of sockets. For the process tree of the spawned training job, a directory is specified for this purpose: each process could write a <pid>-ckpt-completed or <pid>-restore-completed file to the directory to mark its completion of checkpoint or restoration.

In the interceptor, the mapping of virtual physical socket is a critical data structure—socket creation APIs like socket, accept or close would write it, and others read. Each of these operations must be done atomically. Some implementations and examples use a std::condition_variable to implement the lock. That is, each interceptor API would acquire the mutex before writing or reading the map if in process of checkpointing or restoring, so would the checkpoint and restore function triggered by signals.

One complication with signals along with the mutex protecting virtual physical socket number mapping is that, during the time the signal handler is being invoked, the thread that is interrupted will be paused. If this thread is inside the interceptor API, which happens to have already acquired the mutex, the signal handler will wait for the same mutex and hence a deadlock situation emerges.

Some implementations use a fixed array to store the map, similar to how kernel stores file descriptors for the process. This reduces the lock granularity to each individual map entry, a simple compare-and-swap guarantees the atomicity of operations on entry after migration.

For send APIs, the underlying packets in the kernel send queue cannot be lost by all means. During checkpoint, the send queue is drained, and packets sent to the peer successfully. The current code uses shutdown so the queued packets would still be sent out by kernel. The call of shutdown would drain all the send queue and finalize the sending with a FIN flag in last TCP segment. But shutdown is async in nature itself; it returns immediately, while the kernel might take seconds to drain the queue. So a way to know when shutdown is finished from the TCP protocol perspective is needed, and the socket may be closed thereafter. To determine when shutdown occurs, some implementations and examples use a SO_LINGER option. But even with SO_LINGER, in case it timed out or failed, another mechanism is used dump the send queue and fill it up at restoration time, or report the error to an upper layer. Both shutdown and SO_LINGER option are for sending side guarantees. For the receiving side, the other end might have queued data not being able to send out.

Interceptor data is usually maintained by the interceptor instance object. The instance should be only created once for a process—there could be parallelism that multiple threads within the process try to create/get the interceptor instance. After forking, some implementations continue to use the interceptor instance that is inherited from process (with copy-on-write, of course), instead of re-initialization, since file/socket descriptors are also inherited by fork semantics. The current code makes sure that if the instance variable is null, acquires a mutex and create/assign the instance variable. If after acquiring the mutex but before assignment, the process forks, the child process might inherit a locked mutex When the training job process forks, similar to file descriptor, its socket descriptors would be inherited by the child process, which means providing the mapping of virtual physical socket descriptors over to the child process too, which is already duplicated by the kernel. When the child process initiates an execv/execve, the shared library will be re-initialized (assuming that execve still carries the same LD_PRELOAD env variable), but all files or sockets with no close-on-exec flag would be inherited. Disallowing such scenario might be desired and the risk is small—it is quite uncommon to pass socket connection across execv/execve.

When the training job process is checkpointed, and later restored in potentially another host, the container IP might change. If the job is composed of multiple containers running in lock-step training, the other jobs would have to be notified of such IP change, and the connection re-established as such. This require knowledge of the rank of the remote side for each connection (and recognize whether the remote side is external and thus does not have a rank). So during restore the connection on the client side is re-established and re-attachment of the physical socket is performed to the virtualized socket on the server side when the client reconnects. Some implementations and examples use a network file system (NFS) to record such information, performing the following operations. Every rank publishes a file for every listening socket it has, with information about IP address, listening port and the rank. Every rank publishes a file for every client side open connection it has. The file needs to contain information such as its local IP address, port, rank. When the socket is closed, the file is removed. During checkpoint, for every open connection, the above file can be used to do a lookup via the remote IP address and port to get the remote rank. During restore, the client side can use the remote rank to look up the remote server IP address and reconnect. The server side can look up the remote side rank and then attach to the right virtualized socket.

2. Environmental Variable Dependencies (Strategy: ALLOW)

In some implementations, the worker script uses environment variables at one point of the script (typically during initialization), and then references those environment variables at another point to perform some task. As the rest of the code relies on the state transmitted through ENV variables, the implementations preserve this. The implementations intercept the setenv calls (set environment) and keeps track of all such variables that are set within the script. They are then replayed after process migration before releasing the barrier. It is possible that some checkpointing libraries already preserve the env state as part of its checkpoint, in which case implementations rely on that.

3. Unsafe System Calls (Strategy: ALLOW/DENY)

A similar strategy works for some or all of the system calls that affect in-memory state of the OS, such as, for example but without limitation, mutations to/proc, or shared memory creations that happen internally. Some implementations keep track of the state changing system calls, and communicates enough information as part of the checkpoint to replay them at the other end. This sometimes works on an allow-listing based approach. Except for the system calls that are explicitly allowed and for which replay is handled, the others are treated as non-conformant in some implementations.

4. Arbitrary Network Communication (Strategy: DENY→ALLOW)

The inter-worker consistency requirement is violated when workers within a job perform arbitrary network communication. As this communication is opaque to the user, they could be exchanging data that matters for consistency (e.g., an allreduce). Thus, after restore, the job may get to an inconsistent/incorrect state. Some implementations handle this by intercepting on socket connect system call, and if the connection is made to an Internet Protocol (IP) address that belongs to another peer worker, disallowing it and flagging the job as non-compliant. In this way, implementations and examples allow only recognized libraries to be used between workers, and prevents all other communication.

Some implementations employ a more complex strategy to handle perform arbitrary network communications transparently (similar to the local file system). In some examples, the above strategy may be too restrictive especially if there is support for training on CPUs, etc. (which would use an entire slew of third-party communication libraries). In some implementations, the three properties preserved are: (a) the socket endpoints are still meaningful after the migration (b) no in-flight data of any socket was lost (c) exactly once delivery of the data to the recipient (no duplicates). In some implementations and examples, this is achieved by transparently intercepting the following basic socket calls: connect, bind, send, recv, epoll, select. For property (a), implementations perform a fresh connect and bind as part of release-barrier, with the new IP address that the peer endpoint is now placed at. For properties (b) and (c), each end-point to a socket tracks a per-socket sequence number (this is application level, so completely different from the TCP sequence number), which is the number of sends and recvs that have been done on the socket, and a "control handshake" is performed on this socket with the sequence numbers at both ends (invisible to the app layer) after restore.

If any data is lost in migration, the original node 704 re-sends that data corresponding to the missing sequence numbers. To be able to do this, and interceptor temporarily keeps a local copy of data that was sent, which may be subject to a maximum buffer size. Once the maximum buffer-size limit is hit, the interceptor at the two endpoints perform a handshake to sync on the sequence number successfully received (again invisible to the app layer), so that the original node 704 is able to free the buffer.

While the above is straightforward if the nodes only use send and recv, epoll and select may also be handled to separate out handshake traffic from real application traffic. With the above mechanism, it is simulating a per-socket barrier. This is feasible here because unlike device-to-device communication libraries rife with GPU-kernel-level deadlocks in the collective path, the API for CPU-level socket communication seems to be lower-surface-area and hence more tractable. Native support for restoring sockets may not work because it assumes that the IP addresses of the nodes are unchanged (e.g., require some virtualization of IP addresses by the orchestrator).

5. Writes to External Services (Strategy: ALLOW)

There are external services such as wandb (weights and biases) or tensorboard that DLT jobs 702 write to. These track state about the execution of the DLT jobs 702 over time. While these services are unaffected for planned pre-emptions (e.g., post barrier, etc), unplanned failures cause a problem. When the DLT jobs 702 restores from a previous continuous checkpoint (e.g., from 15 minutes ago), the external service would "go back in time," causing unexpected UI artifacts/weirdness. With tensorboard, this is handled by snapshotting the tensorboard logs along with the checkpoint (as part of the output file system checkpointing).

In scenarios where the DLT jobs 702 is classified as non-compliant, some implementations build a quick "simulation" environment to emulate, or mock, a GPU and run a particular DLT job 702 in fast-forward mode. Some implementations and examples stop all GPU operations while mocking the state-changing APIs. In some examples, this simulator is capable of being run in a dev box with minimal resource usage, and can serve as a dry run of the whole DLT job 702.

Other examples perform checkpointing across numerous GPUs. For example, there may be a DLT job 702 running on hundreds of GPUs. Collaboratively, because these hundreds of GPUs are working together, a consistent checkpoint must be taken. To do so, the checkpoint service 710 applies and uses a "distributive barrier" protocol across the multiple different GPUs of the original nodes 704. In operation, each worker of the original node 704 runs a mini-batch, and then at the end of all the mini-batches, the workers all exchange the results. At the end of the mini-batches, each worker determines a gradient then performs one or more all-reduces. For some GPUs, the all-reduce library is part of a library providing inter-GPU communication primitives. Some examples interpose on the all-reduce happens, effectively piggybacking a new protocol on top of the regular all-reduce that the user performs. Other examples introduce the new protocol on similar types of all-reduce calls.

Alternatively, the checkpoint service 710 may implement a multi-GPU barrier through performing a "meta-all-reduce" before an actual all-reduce is performed. This requires some additional interceptors to be coded that interact with communication library calls. The meta-all-reduce is performed asynchronously in the background to ensure latency issues are not created. When the disclosed schedulers decide to migrate a job, such migration is done on-demand. When an all-reduce is performed, a sum is computed across all of the workers/GPUs. The disclosed examples use a similar sum to quickly figure how many all-reduces the workers have issued. A maximum all-reduce count is computed, giving a barrier point for when to stop all of the workers to effectuate migration.

Figure 8:
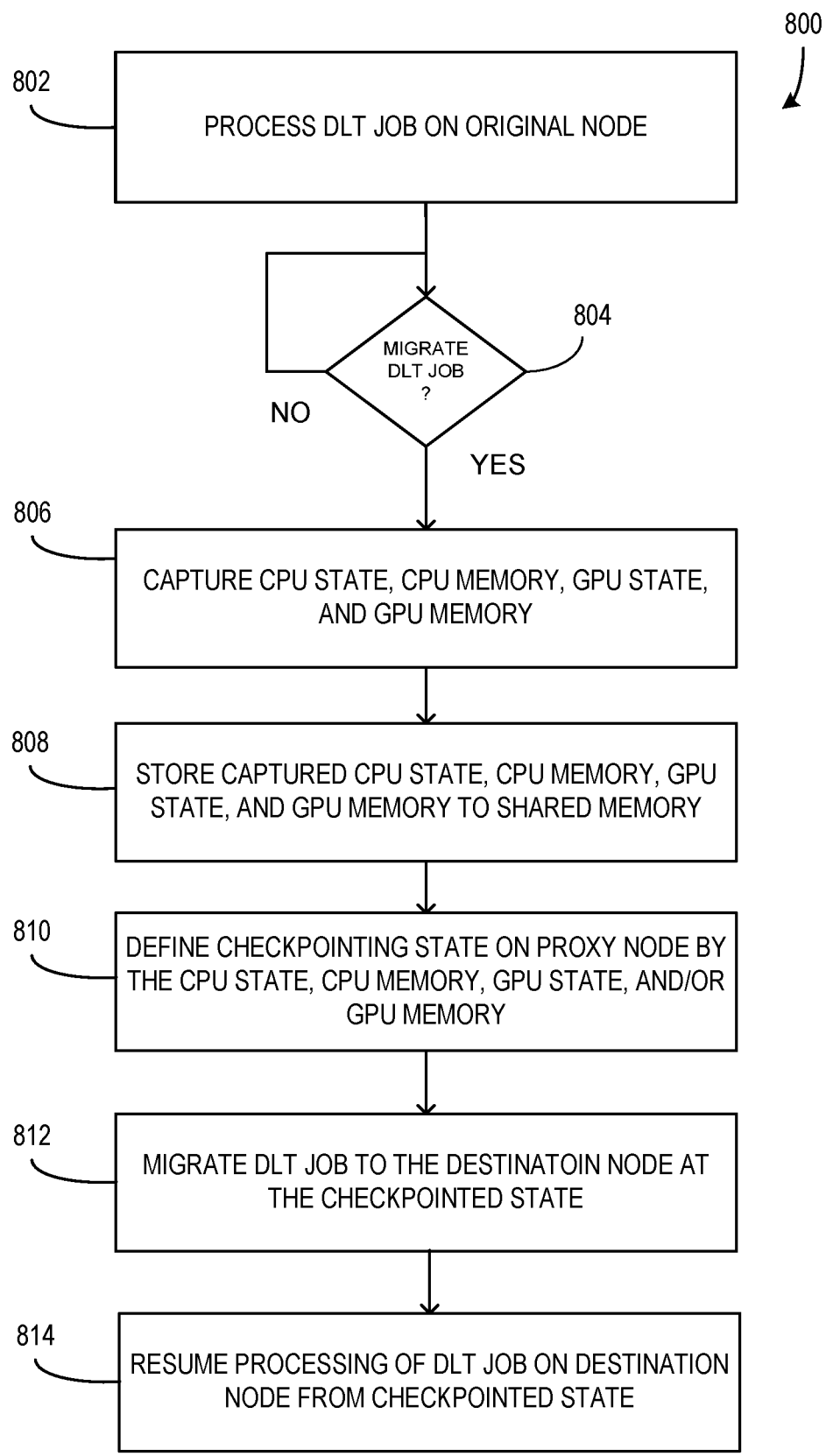
FIG. 8 illustrates a flow chart diagram depicting an operation flow for checkpointing of a DLT job, at a source node in a cloud computing environment and resuming the DLT job from the checkpointed state on a different destination node.

FIG. 8 illustrates a flow chart diagram depicting an operational flow 800 for checkpointing of a DLT job, at one (original or source) node in a cloud computing environment and resuming the DLT job from the checkpointed state on a different (destination) node. Operational flow 800 involves a DLT job being processed on the original node, as shown at 802. This happens until either the DLT job is finished processing or until either the global scheduler, regional scheduler, or coordinator service schedules to have the DLT job migrated to the destination node, as shown at 804. If so, the GPU state, GPU memory, CPU state, and CPU memory, or a combination thereof, are captured, as shown at 806, and moved the previously discussed shared memory, which is shared between the original node and a proxy node, as shown at 808. A checkpointed state is defined on the proxy node by the GPU state and CPU state, or by any combination of the CPU state, CPU memory, GPU state, and GPU memory, as shown at 810. The DLT job is migrated to the destination node at the checkpointed state, as shown at 813. And processing of the DLT job is resumed on the destination node from the checkpointed state, as shown at 814.

Figure 9:
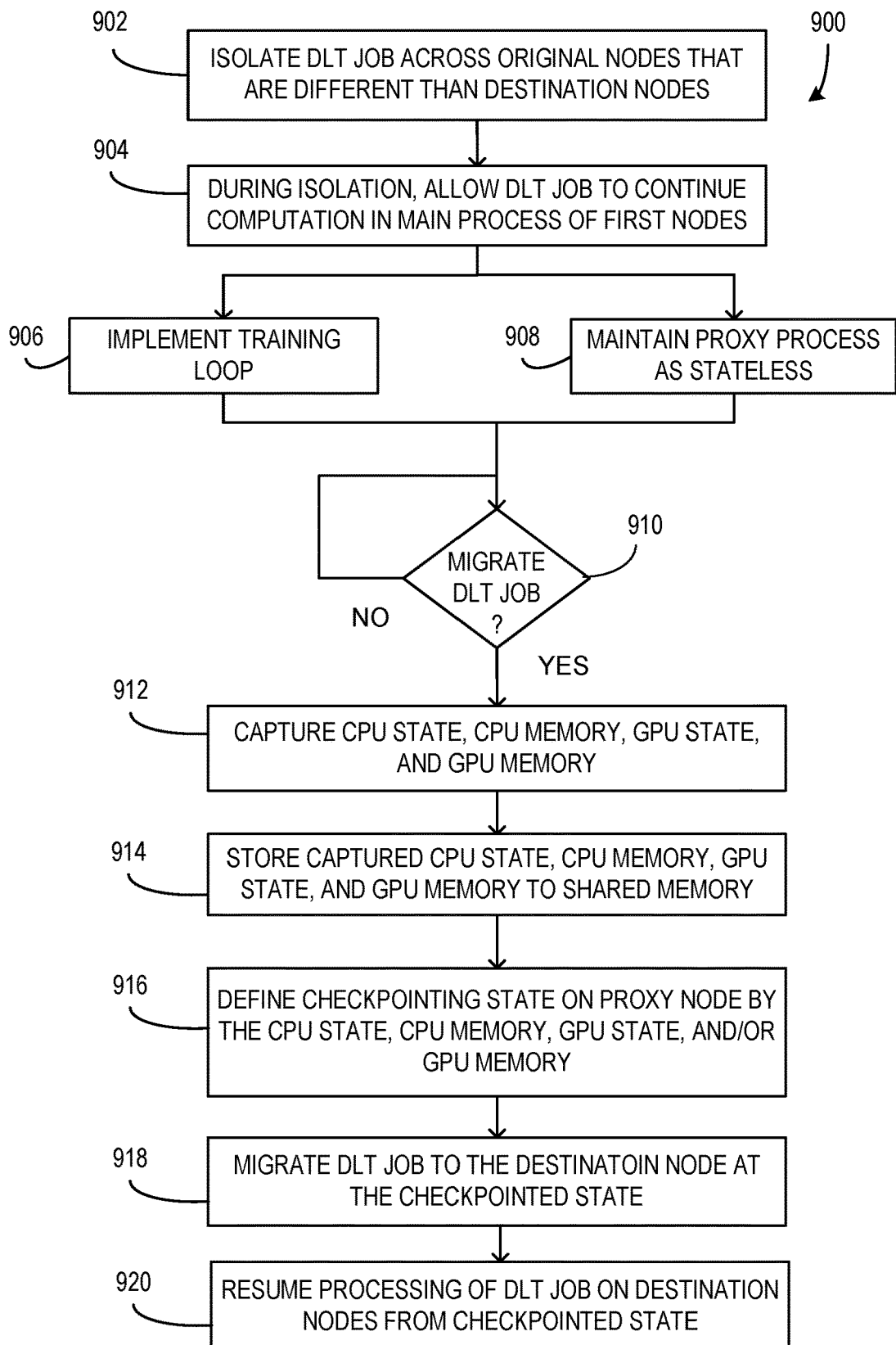
FIG. 9 illustrates a flow chart diagram depicting an operation flow for checkpointing a DLT job across a plurality of first nodes in a cloud computing environment and resuming the DLT job from a checkpointed state across a plurality of second nodes that are different than the first nodes.

FIG. 9 illustrates a flow chart diagram depicting an operational flow 900 for checkpointing of a DLT job across a plurality of first nodes in a cloud computing environment and resuming the DLT job from a checkpointed state across a plurality of second nodes that are different than the first nodes. Operational flow 900 involves isolating GPU-related activity of the DLT job across a first group of original nodes that are different than the destination nodes, as shown at 902. This isolation may be done using the proxy process discussed above. During the isolation, the DLT job is allowed to continue computations in one or more main processes of the first nodes, as shown at 904. In some implementations and examples, the computation includes Python code with a PT/TF training loop being implemented, as shown at 906, and the proxy process used to isolate the DLT job is maintained in a stateless state across a plurality of checkpoints until migration occurs, as shown at 908. These two are implemented and maintained until the DLT job 702 finishes processing or is scheduled to be migrated, the latter being shown at 910.

When migration is scheduled by the global scheduler, regional scheduler, the DLT job is migrated to the destination nodes, the GPU state, GPU memory, CPU state, and CPU memory, or a combination thereof, are captured, as shown at 912, and moved the previously discussed shared memory, which is shared between the original node and a proxy node, as shown at 914 A checkpointed state may then be defined on the proxy node by the GPU state and CPU state, or by any combination of the CPU state, CPU memory, GPU state, and GPU memory, as shown at 916. The DLT job may then be migrated to the destination nodes at the checkpointed state, as shown at 918. And processing of the DLT job may be resumed on the destinations node from the checkpointed state, as shown at 920.

Additionally or alternatively, some of the disclosed examples capture a "checkpoint state" comprising model parameters that are written to memory, SSD, hard disks, or the like during checkpointing, and this checkpoint state is read during restore on the destination node 608. Additionally, GPU function call parameters are shared between original node 604 and the proxy node 606 that is read and written in shared memory between the two, and accessed continuously when a DLT job 602 is running.

Figure 10:
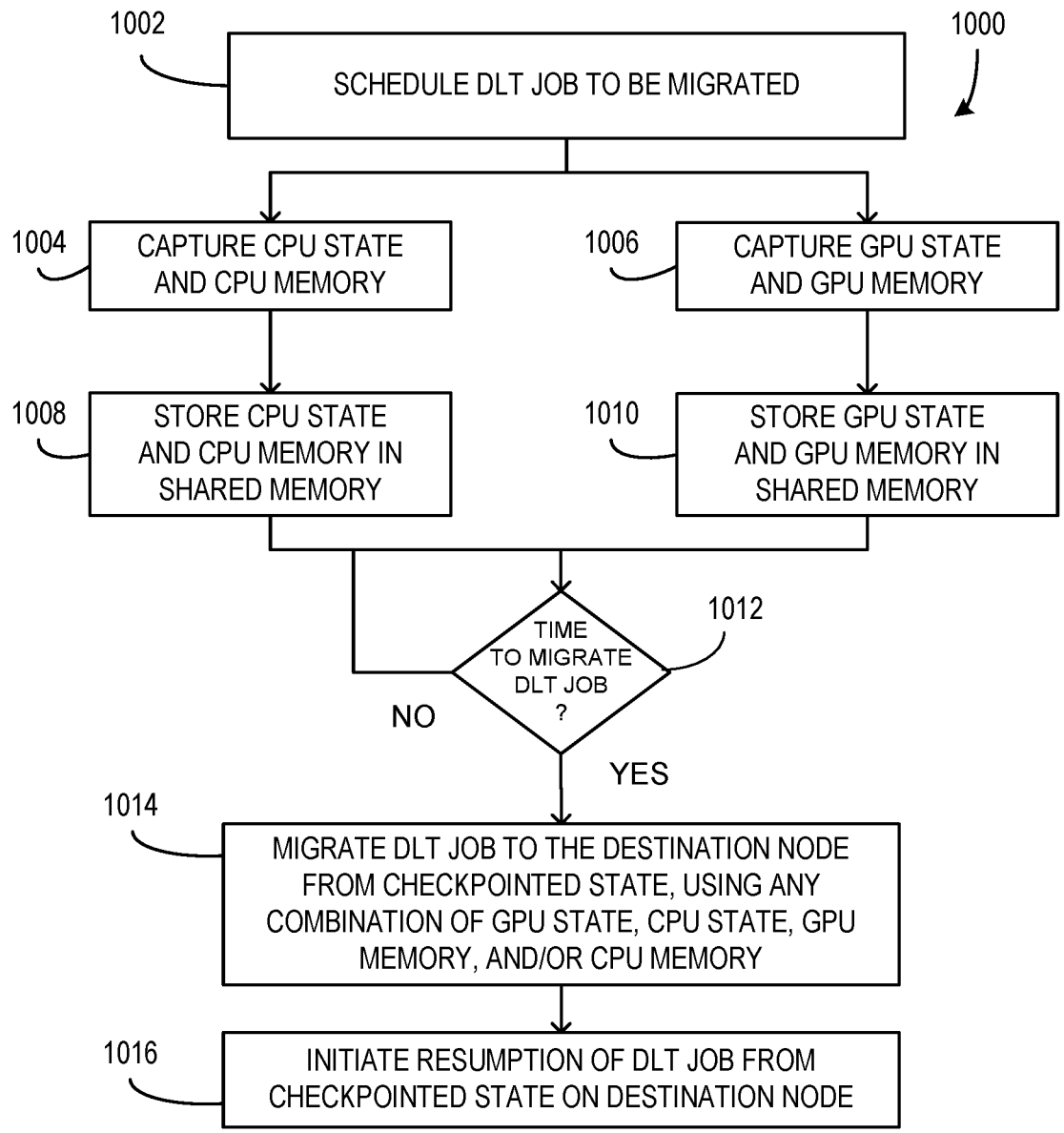
FIG. 10 illustrates a flowchart diagram of an operation flow for migrating a DLT job operating at a source node of a cloud computing environment and resuming the DLT job from a checkpointed state on a destination node that is different than the source node.

FIG. 10 illustrates a flowchart diagram of an operation flow 1000 for migrating a DLT job operating at an original node of a cloud computing environment and resuming the DLT job from a checkpointed state on a destination node that is different than the original node, according to an embodiment. Operation flow 1000 involves scheduling the DLT job to be migrated to the destination, as shown at 1002, which may be set to occur concurrently or at a future time, as shown at 1002. The DLT job is checkpointed by the checkpoint service, capturing the CPU state, CPU memory, GPU state, and GPU memory through a proxy node, as shown at 1004 and 1006. In particular, the GPU state includes GPU data for model parameters and an optimizer state located in the GPU at a time of checkpointing. As shown at 1008 and 1010, the CPU state, CPU memory, GPU state, and GPU memory are stored in shared memory that is used by a proxy node to checkpoint the DLT job being migrated.

As shown at 1012, operation flow 1000 waits until the DLT job is to be migrated, as shown at 1012. The migration service may schedule the migration for some time in the future or to be performed immediately. Once the DLT job is to be migrated, the migration service migrates the DLT job to the destination node from the checkpointed state determined from, at least, the GPU state, the CPU state, the CPU memory, and/or the GPU memory, as shown at 1014. Processing of the DLT job may then be resumed on the destination node from the checkpointed state, as shown at 1016.

Figure 11:
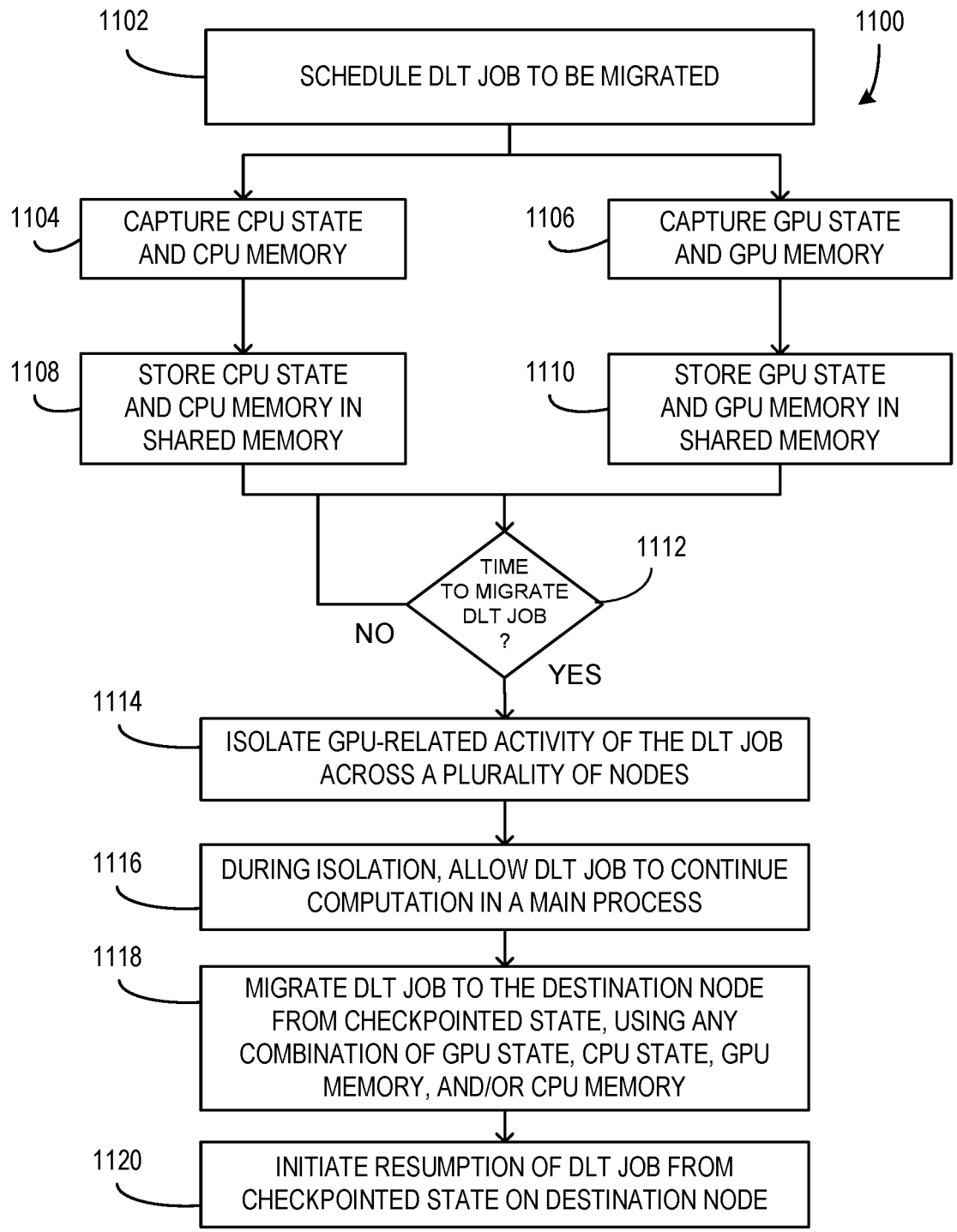
FIG. 11 illustrates a flowchart diagram of an operation flow for migrating a DLT job operating at a source node of a cloud computing environment and resuming the DLT job from a checkpointed state on a destination node that is different than the source node.

FIG. 11 illustrates a flowchart diagram of an operation flow 1100 for migrating a DLT job operating at an original node of a cloud computing environment and resuming the DLT job from a checkpointed state on a destination node that is different than the original node, according to an embodiment. Operation flow 1100 involves scheduling the DLT job to be migrated to the destination, as shown at 1102, which may be set to occur concurrently or at a future time, as shown at 1102. The DLT job is checkpointed by the checkpoint service, capturing the CPU state, CPU memory, GPU state, and GPU memory through a proxy node, as shown at 1104 and 1106. In particular, the GPU state includes GPU data for model parameters and an optimizer state located in the GPU at a time of checkpointing. As shown at 1108 and 1110, the CPU state, CPU memory, GPU state, and GPU memory are stored in shared memory that is used by a proxy node to checkpoint the DLT job being migrated.

Migration of the DLT job additionally involves, among other things, isolating GPU-related activity of the DLT job across a plurality of nodes in the cloud environment, as shown at 1114. During this isolation, the DLT job is allowed to continue computation in a main process on the plurality of nodes, as shown at 1116. Once the DLT job is to be migrated, the migration service migrates the DLT job to the destination node from the checkpointed state determined from, at least, the GPU state, the CPU state, the CPU memory, and/or the GPU memory, as shown at 1118. Processing of the DLT job may then be resumed on the destination node from the checkpointed state, as shown at 1120.

Example Operating Environment

Figure 12:
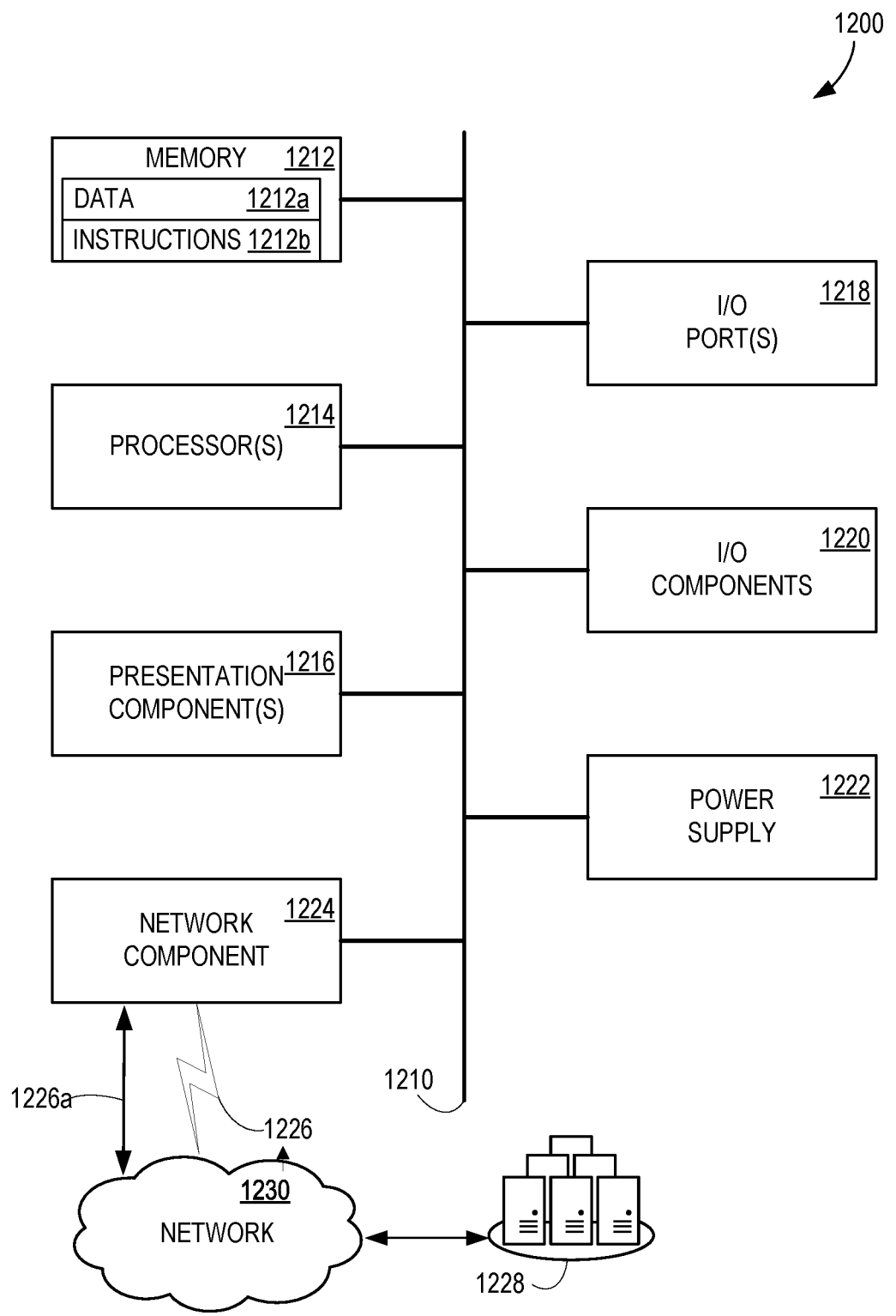
FIG. 12 illustrates an example computing device.

FIG. 12 is a block diagram of an example computing device 1200 for implementing aspects disclosed herein, and is designated generally as computing device 1200. Computing device 1200 is but one example of a suitable computing environment and is not intended to suggest any limitation as to the scope of use or functionality of the examples disclosed herein. Neither should computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer-storage memory 1212, one or more processors 1214, one or more presentation components 1216, input/output (I/O) ports 1218, I/O components 1220, a power supply 1222, and a network component 1224. While computing device 1200 is depicted as a seemingly single device, multiple computing devices 1200 may work together and share the depicted device resources. For example, memory 912 is distributed across multiple devices, and processor(s) 1214 is housed with different devices.

Bus 1210 represents what may be one or more busses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device." Memory 1212 may take the form of the computer-storage media references below and operatively provide storage of computer-readable instructions, data structures, program modules and other data for the computing device 1200. In some examples, memory 1212 stores one or more of an operating system, a universal application platform, or other program modules and program data. Memory 1212 is thus able to store and access data 1212a and instructions 1212b that are executable by processor 1214 and configured to carry out the various operations disclosed herein.

In some examples, memory 1212 includes computer-storage media in the form of volatile and/or nonvolatile memory, removable or non-removable memory, data disks in virtual environments, or a combination thereof. Memory 1212 may include any quantity of memory associated with or accessible by the computing device 1200. Memory 1212 may be internal to the computing device 1200 (as shown in FIG. 12), external to the computing device 1200 (not shown), or both (not shown). Examples of memory 1212 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1200. Additionally, or alternatively, the memory 1212 may be distributed across multiple computing devices 1200, for example, in a virtualized environment in which instruction processing is carried out on multiple devices 1200. For the purposes of this disclosure, "computer storage media," "computer-storage memory," "memory," and "memory devices" are synonymous terms for the computer-storage memory 1212, and none of these terms include carrier waves or propagating signaling.

Processor(s) 1214 may include any quantity of processing units that read data from various entities, such as memory 1212 or I/O components 1220. Specifically, processor(s) 1214 are programmed to execute computer-executable instructions for implementing aspects of the disclosure. The instructions may be performed by the processor, by multiple processors within the computing device 1200, or by a processor external to the client computing device 1200. In some examples, the processor(s) 1214 are programmed to execute instructions such as those illustrated in the flow charts discussed below and depicted in the accompanying drawings. Moreover, in some examples, the processor(s) 1214 represent an implementation of analog techniques to perform the operations described herein. For example, the operations are performed by an analog client computing device 1200 and/or a digital client computing device 1200. Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1218 allow computing device 1200 to be logically coupled to other devices including I/O components 1220, some of which may be built in. Example I/O components 1220 include, for example but without limitation, a microphone, joystick, game pad, satellite dish, scanner, printer, wireless device, etc.

The computing device 1200 may operate in a networked environment via the network component 1224 using logical connections to one or more remote computers. In some examples, the network component 1224 includes a network interface card and/or computer-executable instructions (e.g., a driver) for operating the network interface card. Communication between the computing device 1200 and other devices may occur using any protocol or mechanism over any wired or wireless connection. In some examples, network component 1224 is operable to communicate data over public, private, or hybrid (public and private) using a transfer protocol, between devices wirelessly using short range communication technologies (e.g., near-field communication (NFC), BLUETOOTH branded communications, or the like), or a combination thereof. Network component 1224 communicates over wireless communication link 1226 and/or a wired communication link 1226a to a cloud resource 1228 across network 1230. Various different examples of communication links 1226 and 1226a include a wireless connection, a wired connection, and/or a dedicated link, and in some examples, at least a portion is routed through the internet.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein for checkpointing DLT jobs on an original node and migrating those checkpointed DLT jobs to a separate destination node.

ADDITIONAL EXAMPLES

Some examples are directed to a method for checkpointing and migrating a deep learning training (DLT) job operating at an original node of a cloud computing environment and resuming the DLT job from a checkpointed state on a destination node that is different than the original node. The method includes: capturing a GPU state of a GPU executing the DLT job; capturing a CPU state of a CPU executing the DLT job; migrating the DLT job to the destination node at the checkpointed state using the GPU state and the CPU state; and initiating resumption of processing of the DLT job from the checkpointed state on the destination node.

Other examples are directed to a method for checkpointing and migrating a deep learning training (DLT) job operating at an original node of a cloud computing environment and resuming the DLT job from a checkpointed state on a destination node that is different than the original node. The method includes: isolating GPU-related activity of the DLT job across a first plurality of nodes in the cloud computing environment into a separate proxy process; during said isolation, allowing the DLT job to continue computation in a main process, wherein said computation comprises a training loop, and wherein the proxy process is stateless across a plurality of checkpoints; migrating a subset or all of the DLT job to the destination node at the checkpointed state using GPU state and CPU state of the DLT job on the original node; and initiating resumption of processing of the subset or all of the DLT job from the checkpointed state on the destination node.

Still other examples are directed to a system for operating a cloud computing environment that facilitates halting deep learning training (DLT) jobs and resuming the DLT jobs from a checkpointed state in a different area of a cloud computing environment. The system includes: an original node in a plurality of first nodes providing processing resources for the DLT jobs; and a destination node in a plurality of first nodes providing secondary processing resources for the DLT jobs. The DLT jobs being are halted on the plurality of first nodes through: isolating GPU-related activity of the DLT job across the first plurality of nodes in the cloud computing environment into a separate proxy process, and during said isolation, allowing the DLT job to continue computation in a main process, wherein said computation comprises Python code with a training loop, and wherein the proxy process is stateless across a plurality of checkpoints; and wherein the DLT jobs are migrated to the plurality of second nodes using the proxy process and the main process.

Alternatively, or in addition to the other examples described herein, examples include any combination of the following:

capturing a portion of GPU memory that is active during processing of the DLT job on the original node, the portion of the GPU memory containing the model parameters;

resuming the DLT job on a second GPU and a second CPU of the destination node that are different than the GPU and the CPU, respectively, of the original node;

saving a program state associated with the DLT job and restoring the DLT job on another node through switching control flow to the program state;

isolating any temporary GPU-related mappings to an address space of a proxy process on a proxy node, wherein the proxy process is stateless across checkpoints, but because the proxy process is stateless, the proxy process is able to be killed and restarted at a destination node;

wherein a main process address space remains without any GPU-related state;

moving GPU-related activity of the DLT job into a separate address space using dynamic library interposition on GPU-related calls, wherein the GPU-related calls are intercepted in the main process by a client of a proxy process;

wherein the DLT job is a PyTorch job;

wherein the DLT job is a TensorFlow job;

wherein an address space of the proxy process is polluted with GPU-related mappings while the main process address space remains without any GPU-related states;

wherein the main process address space is able to be checkpointed;

wherein migration of the DLT job is performed through the proxy process: directing a proxy node to read model parameters from shared memory and executes corresponding GPU calls in an address space of the proxy node, and sending return values to a proxy client through shared memory; and moving GPU-related activity of the DLT job into a separate address space using dynamic library interposition on GPU-related calls, wherein the GPU-related calls are intercepted in the main process by a client of a proxy service.

The embodiments illustrated and described herein as well as embodiments not specifically described herein but within the scope of aspects of the claims constitute an exemplary means for checkpointing and migrating a machine-learning job (or DLT job), by at least one processor of the cloud infrastructure platform, from one or more original nodes to one or more destination nodes, using one or more proxy nodes.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer-implemented method comprising:
   capturing a graphics processing unit (GPU) state of a GPU executing a deep learning training (DLT) job at a source node of a cloud computing environment, wherein the GPU state includes GPU data comprising model parameters located in the GPU at a time of checkpointing;
   capturing a central processing unit (CPU) state of a CPU executing the DLT job;
   generating a distributed snapshot of all workers associated with the DLT job;
   migrating the DLT job to a destination node at a checkpointed state using the GPU state and the CPU state according to the distributed snapshot, wherein the destination node is different than the source node; and
   initiating resumption of processing of the DLT job from the checkpointed state on the destination node.

2. The computer-implemented method of claim 1, further comprising capturing a portion of GPU memory that is active during processing of the DLT job on the source node, the portion of the GPU memory containing the model parameters.

3. The computer-implemented method of claim 1, further comprising:
   resuming the DLT job on a second GPU and a second CPU of the destination node that are different than the GPU and the CPU, respectively, of the source node.

4. The computer-implemented method of claim 1, further comprising:
   saving a program state associated with the DLT job; and
   restoring the DLT job on another node through switching control flow to the program state.

5. The computer-implemented method of claim 1, further comprising:
   isolating any temporary GPU-related mappings to an address space of a proxy process on a proxy node; and
   computing the DLT job in a main process associated with the CPU,
   wherein the proxy process is stateless across checkpoints.

6. The computer-implemented method of claim 5, wherein a main process address space remains without any GPU-related state.

7. The computer-implemented method of claim 5, further comprising:
   directing a proxy server to read GPU function call parameters from shared memory;
   executing the GPU function calls in an address space of the proxy process; and
   sending return values to a client of the proxy node through shared memory.

8. The computer-implemented method of claim 1, further comprising:
   moving GPU-related activity of the DLT job into a separate address space using dynamic library interposition on GPU-related calls, wherein the GPU-related calls are intercepted in a main process by a client of a proxy process.

9. The computer-implemented method of claim 1, further comprising, prior to initiating resumption of processing of the DLT job from the checkpointed state on the destination node, copying, to the destination node, a delta of changes made to a file system on the source node, the changes being made after capturing the GPU state and the CPU state.

10. The computer-implemented method of claim 1, wherein:
    the distributed snapshot of all workers associated with the DLT job is generated for intra-worker completeness and inter-worker consistency, and
    the computer-implemented method further comprises storing the distributed snapshot as part of the checkpointed state.

11. A system, comprising:
    a processor;
    a memory storing instructions executed by the processor;
    a checkpoint service, implemented on the processor, that:
       captures a graphics processing unit (GPU) state of a GPU executing a deep learning training (DLT) job at a source node of a cloud computing environment, wherein the GPU state includes GPU data comprising model parameters located in the GPU at a time of checkpointing, and
       captures a central processing unit (CPU) state of a CPU executing the DLT job; and
    a migration service, implemented on the processor, that:
       generates a distributed snapshot of all workers associated with the DLT job;
       migrates the DLT job to a destination node at a checkpointed state using the GPU state and the CPU state according to the distributed snapshot, where the destination node is different than the source node, and
       resumes processing of the DLT job from the checkpointed state on the destination node.

12. The system of claim 11 wherein the checkpoint service further:
    captures a portion of GPU memory that is active during processing of the DLT job on the source node, the portion of the GPU memory containing the model parameters.

13. The system of claim 11 wherein the checkpoint service further:
resumes the DLT job on a second GPU and a second CPU of the destination node that are different than the GPU and the CPU, respectively, of the source node.

14. The system of claim 11 wherein the checkpoint service further:
saves a program state associated with the DLT job; and
restores the DLT job on another node through switching control flow to the program state.

15. The system of claim 11 wherein the checkpoint service further:
isolates any temporary GPU-related mappings to an address space of a proxy process on a proxy node; and
computes the DLT job in a main process associated with the CPU,
wherein the proxy process is stateless across checkpoints.

16. The system of claim 15 wherein the checkpoint service further:
directs a proxy server to read GPU function call parameters from shared memory;
executes the GPU function calls in an address space of the proxy process; and
sends return values to a client of the proxy node through shared memory,
wherein a main process address space remains without any GPU-related state.

17. The system of claim 11 wherein the checkpoint service further:
moves GPU-related activity of the DLT job into a separate address space using dynamic library interposition on GPU-related calls, wherein the GPU-related calls are intercepted in a main process by a client of a proxy process.

18. The system of claim 11 wherein the checkpoint service further:
prior to initiating resumption of processing of the DLT job from the checkpointed state on the destination node, copies, to the destination node, a delta of changes made to a file system on the source node, the changes being made after capturing the GPU state and the CPU state.

19. The system of claim 11 wherein the checkpoint service further:
saves all file system changes during a previous iteration of the DLT job on the source node; and
restores the saved file system changes at a container of the destination node.

20. A non-transitory computer-readable medium storing instructions that, when executed by a processor, cause the processor to:
capture a graphics processing unit (GPU) state of a GPU executing a deep learning training (DLT) job at a source node of a cloud computing environment, wherein the GPU state includes GPU data comprising model parameters located in the GPU at a time of checkpointing;
capture a central processing unit (CPU) state of a CPU executing the DLT job, wherein a checkpointed state comprises the GPU state and the CPU state;
generate a distributed snapshot of all workers associated with the DLT job;
migrate the DLT job to a destination node at a checkpointed state using the GPU state and the CPU state according to the distributed snapshot, wherein the destination node is different than the source node; and
initiate resumption of processing of the DLT job from the checkpointed state on the destination node.

* * * * *